(12) United States Patent
Rebstock et al.

(10) Patent No.: US 11,769,010 B2
(45) Date of Patent: Sep. 26, 2023

(54) DOCUMENT MANAGEMENT WORKFLOW FOR REDACTED DOCUMENTS

(75) Inventors: John Rebstock, Edmonton (CA); Christopher K. Schrichte, Missoula, MT (US)

(73) Assignee: Celcorp, Inc., Edmonton (CA)

( * ) Notice: Subject to any disclaimer, the term of this patent is extended or adjusted under 35 U.S.C. 154(b) by 3309 days.

(21) Appl. No.: 12/152,763

(22) Filed: May 16, 2008

(65) Prior Publication Data
US 2009/0089663 A1   Apr. 2, 2009

Related U.S. Application Data

(63) Continuation-in-part of application No. 11/544,685, filed on Oct. 6, 2006.

(60) Provisional application No. 60/724,986, filed on Oct. 6, 2005.

(51) Int. Cl.
G06F 17/00 (2019.01)
G06F 40/253 (2020.01)
G06F 40/166 (2020.01)

(52) U.S. Cl.
CPC .......... *G06F 40/253* (2020.01); *G06F 40/166* (2020.01)

(58) Field of Classification Search
CPC .... G06F 17/274; G06F 17/24; G06F 21/6245; G06F 2221/2113; G06F 19/321; G06F 21/6254; G06F 40/253; G06F 40/166; H04N 1/00838; H04N 1/00846; H04N 1/00848; H04N 1/00864; H04N 1/00856; H04L 63/0428

USPC ....... 715/205, 209–210, 230, 234, 246, 253, 715/255–256, 271, 229; 709/203–204, 709/206–207, 246; 707/999.001, 707/999.003, 999.005, 999.009, 999.01, 707/999.1, 999.103, 999.107; 705/3, 34, 705/40, 51; 713/176

See application file for complete search history.

(56) References Cited

U.S. PATENT DOCUMENTS

| | | | | |
|---|---|---|---|---|
| 5,235,681 A | * | 8/1993 | Masuzaki | G06F 16/40 345/556 |
| 5,581,682 A | * | 12/1996 | Anderson | G06F 17/241 715/236 |
| 5,903,646 A | * | 5/1999 | Rackman | |
| 5,982,956 A | * | 11/1999 | Lahmi | H04N 1/00846 358/401 |
| 5,991,709 A | * | 11/1999 | Schoen | G06Q 99/00 704/1 |
| 6,279,013 B1 | * | 8/2001 | LaMarca | G06Q 30/02 379/100.07 |

(Continued)

OTHER PUBLICATIONS

Xerox, "FlowPort, Installation and Setup Guide, Version 2.1," © Nov. 2000, Xerox, 56 pages.*

(Continued)

*Primary Examiner* — Cesar B Paula
*Assistant Examiner* — James H. Blackwell
(74) *Attorney, Agent, or Firm* — Harrington & Smith

(57) ABSTRACT

A method including accessing an electronic document from a source of electronic documents; determining if the electronic document is redaction protected; and when the electronic document is redaction protected, allowing the electronic document to be opened only if a redaction application is available to allow opening of the electronic document with a redaction.

8 Claims, 21 Drawing Sheets

(56) References Cited

U.S. PATENT DOCUMENTS

| | | | |
|---|---|---|---|
| 6,477,550 B1* | 11/2002 | Balasubramaniam | G06F 9/44526 715/234 |
| 6,889,205 B1 | 5/2005 | Lamm | 705/40 |
| 7,216,125 B2 | 5/2007 | Goodwin | |
| 7,272,610 B2* | 9/2007 | Torres | |
| 7,292,723 B2 | 11/2007 | Tedesco et al. | 382/159 |
| 7,295,988 B1* | 11/2007 | Reeves | G16H 10/60 705/3 |
| 7,428,701 B1 | 9/2008 | Gavin et al. | 715/243 |
| 7,590,693 B1 | 9/2009 | Chan et al. | 709/206 |
| 7,624,027 B1* | 11/2009 | Stern | G06Q 10/10 705/2 |
| 7,627,152 B2* | 12/2009 | Mathew | G06T 5/005 382/128 |
| 7,653,876 B2 | 1/2010 | Ethier et al. | 715/249 |
| 8,078,512 B1 | 12/2011 | Haberaecker et al. | |
| 8,181,261 B2* | 5/2012 | Sperry | G06F 21/6245 380/243 |
| 8,521,632 B2 | 8/2013 | Planitzer | |
| 10,733,434 B2* | 8/2020 | Cramer | G06K 9/00463 |
| 2001/0018739 A1 | 8/2001 | Anderson | |
| 2002/0062342 A1 | 5/2002 | Sidies | 709/203 |
| 2002/0065901 A1* | 5/2002 | Goodwin, III | G06F 21/6245 709/218 |
| 2002/0075505 A1 | 6/2002 | Murray | 358/1.15 |
| 2002/0083079 A1 | 6/2002 | Meier et al. | 707/104.1 |
| 2002/0091734 A1* | 7/2002 | Redlich | G06F 21/6209 715/234 |
| 2002/0158864 A1* | 10/2002 | Matichuk | G06Q 10/00 345/418 |
| 2002/0188187 A1* | 12/2002 | Jordan | H04N 1/38 600/407 |
| 2003/0014394 A1 | 1/2003 | Fujiwara et al. | 707/3 |
| 2003/0051054 A1 | 3/2003 | Redlich et al. | 709/246 |
| 2003/0084339 A1* | 5/2003 | Roginsky | G06F 21/6245 726/4 |
| 2003/0115481 A1* | 6/2003 | Baird et al. | |
| 2003/0145017 A1 | 7/2003 | Patton et al. | 707/104.1 |
| 2003/0160095 A1 | 8/2003 | Segal | |
| 2003/0172034 A1 | 9/2003 | Schneck et al. | 705/54 |
| 2003/0217034 A1 | 11/2003 | Shutt | |
| 2004/0075692 A1* | 4/2004 | Matichuk | G06F 9/45512 715/806 |
| 2004/0088313 A1 | 5/2004 | Torres | 707/101 |
| 2004/0139043 A1 | 7/2004 | Lei et al. | 707/1 |
| 2004/0162831 A1 | 8/2004 | Patterson | |
| 2004/0202386 A1 | 10/2004 | Quine | |
| 2004/0210834 A1 | 10/2004 | Duncan | |
| 2004/0220919 A1 | 11/2004 | Kobayashi | 707/3 |
| 2004/0236651 A1 | 11/2004 | Emde et al. | 705/34 |
| 2004/0243925 A1 | 12/2004 | Yates | |
| 2005/0002053 A1* | 1/2005 | Meador | H04N 1/4446 358/1.14 |
| 2005/0015723 A1* | 1/2005 | Light | G06Q 10/10 715/271 |
| 2005/0027495 A1* | 2/2005 | Matichuk | G06F 9/45512 703/2 |
| 2005/0063615 A1* | 3/2005 | Siegel | G06F 17/30867 382/309 |
| 2005/0108351 A1 | 5/2005 | Naick et al. | 709/207 |
| 2005/0111762 A1* | 5/2005 | Mathew | G06T 11/60 382/309 |
| 2005/0246338 A1 | 11/2005 | Bird | 707/9 |
| 2005/0251865 A1* | 11/2005 | Mont | G06F 21/6245 726/26 |
| 2006/0005017 A1* | 1/2006 | Black | H04L 63/0428 713/165 |
| 2006/0075228 A1* | 4/2006 | Black | H04L 63/104 713/167 |
| 2006/0126101 A1 | 6/2006 | Shutt | |
| 2006/0143459 A1* | 6/2006 | Villaron | G06F 21/6254 713/176 |
| 2006/0155863 A1 | 7/2006 | Schmidt | 709/229 |
| 2006/0184522 A1* | 8/2006 | McFarland | G06F 21/608 |
| 2006/0218149 A1 | 9/2006 | Patrick | 707/9 |
| 2006/0242558 A1* | 10/2006 | Racovolis | G06F 17/24 715/205 |
| 2006/0259983 A1 | 11/2006 | Sperry | 726/28 |
| 2007/0027749 A1* | 2/2007 | Peiro | G06Q 30/00 705/14.4 |
| 2007/0030528 A1 | 2/2007 | Quaeler et al. | 358/453 |
| 2007/0174766 A1 | 7/2007 | Rubin et al. | 715/530 |
| 2008/0002911 A1* | 1/2008 | Eisen | G06F 40/166 382/283 |
| 2008/0204788 A1 | 8/2008 | Kelly et al. | 358/1.15 |
| 2009/0089192 A1 | 4/2009 | Ferlitsch | 705/33 |
| 2014/0019318 A1 | 1/2014 | Haberaecker | |
| 2014/0281871 A1* | 9/2014 | Brunner | G06K 9/00483 715/226 |

OTHER PUBLICATIONS

Xerox, "FlowPort, Administrator Guide," © Apr. 2003, Xerox, 76 pages.*

Xerox, "FlowPort, Installation and Setup Guide," © Apr. 2003, Xerox, 62 pages.*

Xerox, "FlowPort User Guide, 2.1.1 SP3 Update," © Apr. 2003, Xerox, 159 pages.*

* cited by examiner

ARREST REPORT

| NAME OF SUSPECT | ADDRESS | OCCUPATION |
|---|---|---|
| JOHN DOE | 1278 ELM STREET SPRINGFIELD, VA | COURIER |

| AGE OF SUSPECT | MONITORING |
|---|---|
| 32 | |

| NAME OF OFFICER | BADGE | HOME OFFICE OF ARRESTING OFFICER |
|---|---|---|
| HENRY THOMPSON | 1234 | SPRINGFIELD, VA |

| TYPE OF ARREST | FELONY (X) MISDEMEANOR ( ) | CONTRABAND SUBSTANCES |
|---|---|---|
| DRUG TRAFFICKING | | COCAINE |

NARRATIVE OF ARREST

FIG.2

| ARREST REPORT | | |
|---|---|---|
| NAME OF SUSPECT | ADDRESS | OCCUPATION |
| JOHN DOE | 1278 ELM STREET SPRINGFIELD, VA __19__ | COURIER |
| AGE OF SUSPECT | (SECTION REDACTED) | |
| 32 | | |
| (SECTION REDACTED) | (SECTION REDACTED) __24__ | (SECTION REDACTED) |
| TYPE OF ARREST | FELONY (X) MISDEMEANOR ( ) __27__ | CONTRABAND SUBSTANCES |
| DRUG TRAFFICKING | | COCAINE |
| NARRATIVE OF ARREST | | |

NARRATIVE OF ARREST:

ON JUNE 20, 2005 JOHN DOE WAS OBSERVED BY SA HENRY THOMPSON AND SA GARY WILLIAMS PURCHASING A TICKET AT THE DELTA AIRLINES TICKET COUNTER. JOHN DOE PROCEEDED TO THE AMERICAN CAFE AT 123 ELM STREET TO MEET WITH FPD INFORMANT "BERT". A WHITE LETTER SIZED ENVELOPE WAS GIVEN TO JOHN DOE BY "BERT". JOHN DOE THEN GAVE "BERT" A SMALL PACKAGE WRAPPED IN BROWN PAPER. SA THOMPSON AND SA WILLIAMS FOLLOWED JOHN DOE FOR APPROXIMATELY ONE BLOCK BEFORE APPREHENDING HIM. JOHN DOE WAS PLACED UNDER ARREST AND THE SMALL PACKAGE EXAMINED AND FOUND TO BE COCAINE

FIG.9

NARRATIVE OF ARREST:

ON JUNE 20, 2005 JOHN DOE WAS OBSERVED BY SA (REDACTED) AND SA (REDACTED) PURCHASING A TICKET AT THE (REDACTED) AIRLINES TICKET COUNTER, JOHN DOE PROCEEDED TO THE AMERICAN CAFE AT 123 ELM STREET TO MEET WITH FPD INFORMANT (REDACTED). A WHITE LETTER SIZED ENVELOPE WAS GIVEN TO JOHN DOE BY (REDACTED). JOHN DOE THEN GAVE (REDACTED) A SMALL PACKAGE WRAPPED IN BROWN PAPER. SA (REDACTED) AND SA (REDACTED) FOLLOWED JOE DOE APPROXIMATELY ONE BLOCK BEFORE APPREHENDING HIM. JOHN DOE WAS PLACED UNDER ARREST AND THE SMALL PACKAGE EXAMINED AND FOUND TO BE COCAINE

DOCUMENT MANAGEMENT WORKFLOW FOR REDACTED DOCUMENTS

CROSS REFERENCE TO RELATED APPLICATION

This application is a continuation-in-part of U.S. patent application Ser. No. 11/544,685 filed Oct. 6, 2006, now U.S. Pat. No. 10,853,570, which claims priority under 35 U.S.C. § 119(e) from U.S. Provisional Patent Application No. 60/724,986 filed on Oct. 6, 2005, which are hereby incorporated by reference in their entireties.

BACKGROUND OF THE INVENTION

Field of the Invention

The invention relates to a system, method and computer program product for creating redacted documents and, more particularly, to an automated redaction system, method and computer program product.

Brief Description of Prior Developments

U.S. Pat. No. 6,889,205, which is hereby incorporated by reference in its entirety, discloses a system and method for preparing a redacted statement, message or file from an electronic statement, message or file and sending it to a party. U.S. Patent Publication Nos. 2002/0158864, 2004/0075692 (now U.S. Pat. No. 7,269,580), and 2005/0027495 (now U.S. Pat. No. 7,454,399), which are hereby incorporated by reference in their entireties, describe automatic creation of graphical representations, and intelligent agents for integrating information access over extended networks.

Businesses as well as Federal, State and Local government agencies must share information. Examples include case files, arrest reports, subpoenaed documents (e.g., Freedom of Information Act—FOIA, Law Enforcement Information Sharing Program—LEISP, etc.) Redacting classified, confidential or secret information from documents can be labor intensive. No effective means of automating the process of removing sensitive information from documents exists. There is a need for a system and method for automatically removing sensitive information from documents; especially a system which can work with different document types.

SUMMARY OF THE INVENTION

In accordance with one aspect of the invention, a method is provided comprising accessing an electronic document from a source of electronic documents; determining if the electronic document is redaction protected; and when the electronic document is redaction protected, allowing the electronic document to be opened only if a redaction application is available to allow opening of the electronic document with a redaction.

In accordance with another aspect of the invention, a method is provided comprising accessing an electronic document from a source of electronic documents; determining if the electronic document is a redacted form of an original document or an unredacted form of the original document; and automatically performing a redaction operation when the electronic document is determined to be an unredacted form of the original document.

In accordance with another aspect of the invention, a method is provided comprising scanning a paper form of a document; automatically performing a redaction of information on the document; and storing an electronic redacted form of the document as a redacted document.

In accordance with another aspect of the invention, a computer program product is provided comprising a computer readable storage medium storing a computer program configured to perform operations when executed by digital processing apparatus, the operations comprising: determining if an electronic document file is a redacted form of a document or an unredacted form of the document; and performing a redaction of information in the electronic document file if the electronic document file is determined to be an unredacted form of the document.

In accordance with another aspect of the invention, a computer program product is provided comprising a computer readable storage medium storing a computer program configured to perform operations when executed by digital processing apparatus, the operations comprising: determining if an electronic document file is a redacted form of a document or an unredacted form of the document; and when the electronic document is determined to be the redacted form of the document, preventing opening of the document by a document viewing application unless a redaction application is operably connected to the document viewing application.

In conclusion, the foregoing summary of the embodiments of the invention is illustrative and non-limiting. For example, one skilled in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 2 depicts a document to be redacted by a system operating in accordance with the invention;

FIG. 3 depicts the document of FIG. 2 in a redacted form generated by a system operating in accordance with the invention;

FIG. 8 depicts a field in the document shown in FIG. 1 that is to be redacted by a system operating in accordance with the invention;

FIG. 9 depicts the document field of FIG. 8 in a redacted form generated by a system operating in accordance with the invention;

DETAILED DESCRIPTION OF THE PREFERRED EMBODIMENTS

Figure 1:
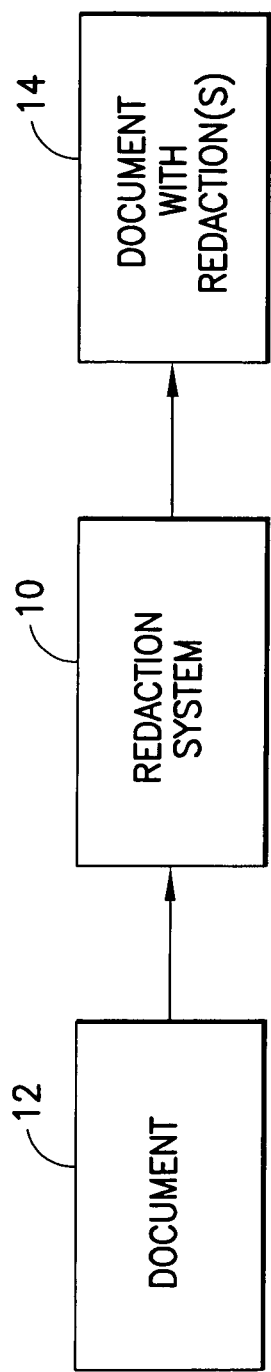
FIG. 1 is a block diagram depicting a redaction system configured to operate in accordance with the invention.

Referring to FIG. 1, there is shown a block diagram of a redaction system 10 incorporating features of the invention. Although the invention will be described with reference to the exemplary embodiments shown in the drawings, it should be understood that the invention can be embodied in many alternate embodiments.

The redaction system 10 is adapted to process a document 12 or electronic version of the document or information in the document to create a modified document 14 or electronic version of the modified document with one or more redactions. An example is shown with reference to FIGS. 2 and 3. FIG. 2 shows a portion of an arrest report 16. The arrest report 16 comprises cells 18-29. The cells of a document could be pre-established with borders such as is shown in FIG. 2, or could be established with the software of the invention. As seen with reference to FIG. 3, one or more of the cells or information in the cells can be redacted in a computer generated modified document 14 of the arrest report 16.

Figure 4:
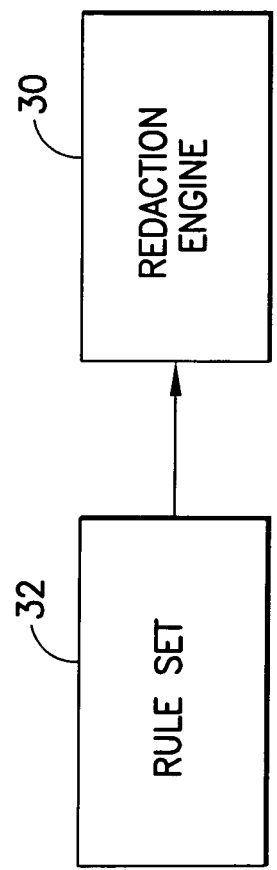
FIG. 4 is a block diagram depicting components of the redaction system comprising an embodiment of the invention depicted in FIG. 1.

Referring also to FIG. 4, the redaction system 10 generally comprises a redaction engine 30 and a rule set 32. The redaction engine 30 generally comprises a computer system. A computer system operating in accordance with the invention can take many forms such as a desktop computer; a notebook computer; or a computing system distributed across a network. In each instance, the computing system comprises a source of documents to be redacted; a memory for storing a program configured to perform operations in accordance with the methods of the invention when executed; and digital processing apparatus coupled to the source of electronic documents to be redacted and the memory. The redaction engine 30 is adapted to take an electronic version of the document 12, and remove or redact information in the document using rules accessed from the rule set 32 to produce the modified document 14. The rule set 32 comprises a set of rules and/or process models to be applied by the redaction engine 30.

Figure 5:
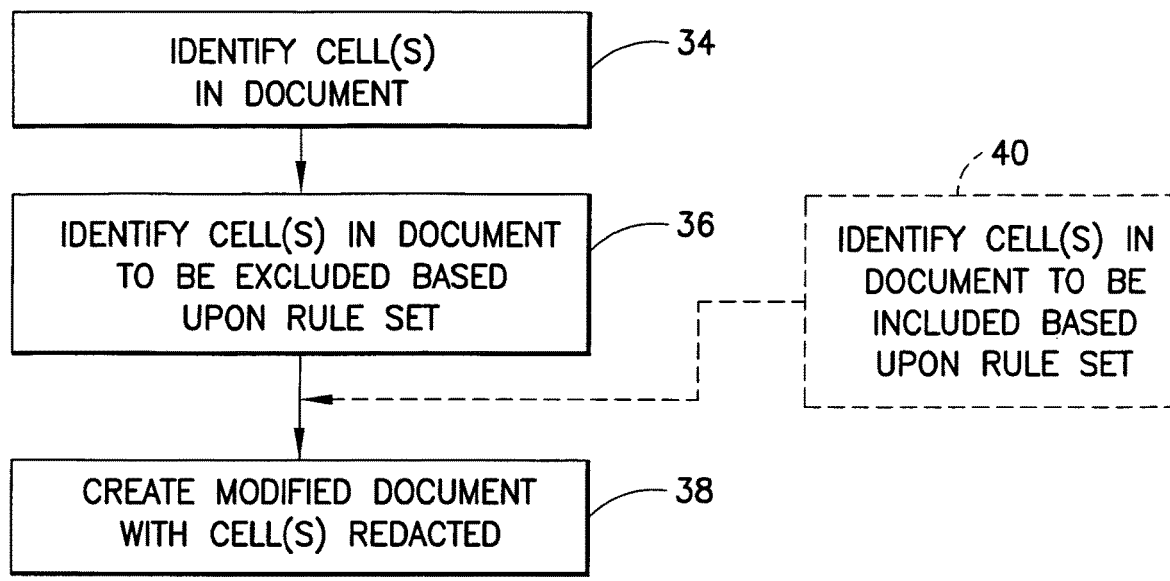
FIG. 5 is a flowchart depicting a method in accordance with the invention.

Referring also to FIG. 5, the redaction engine 30 comprises software which is adapted to identify cell(s) in a document as indicated by block 34. The redaction engine 30 is then able to identify cell(s) in the document to be excluded based upon the rule set 32 as indicated by block 36. As indicated by block 38, the redaction engine can create a modified document with one or more cells redacted. For the example shown in FIGS. 2 and 3, the redaction engine can identify the cells 18-29 in the original document 12, identify the cells 22, 23, 24 and 25 to be excluded based upon the rule set 32, and create the modified document 14 with the information in the cells 22-25 redacted. In this embodiment the redacted information is replaced by the phrase "SECTION REDACTED". However, any suitable type of redaction indicia, such as marking could be provided. In other embodiments, no redaction indicia are provided in the redacted versions of the documents. This masks from users what categories of information have been redacted.

In addition to identifying cell(s) to be excluded, or as an alternative to identifying cell(s) to be excluded when all are to be excluded unless indicated to be included, as indicated by block 40 the redaction engine 30 could be adapted to identify cell(s) in the document to be included based upon the rule set 32. If both 36 and 40 are performed and there is a conflict, preferably block 36 will prevail. However, any suitable conflict resolution configuration or solution could be provided.

Figure 6:
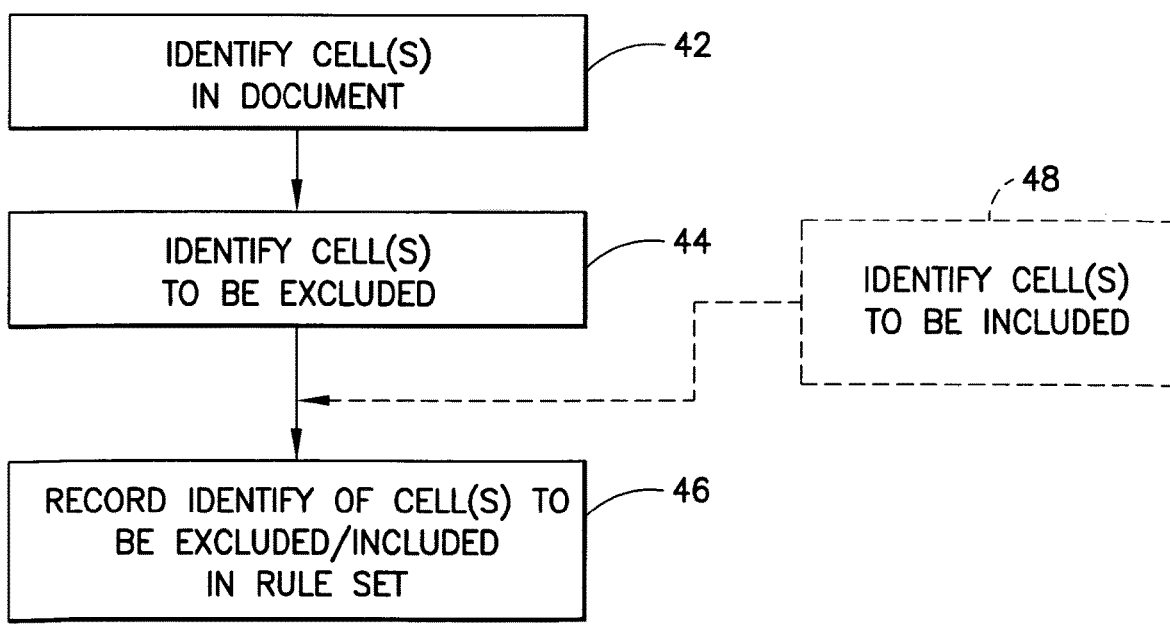
FIG. 6 is a flowchart depicting a method in accordance with the invention.

The rule set 32 is setup or established before the redaction engine 30 can run automatically. Referring also to FIG. 6, establishment of the rule set 32, or at least a portion of the rule set, can comprise identifying cell(s) to be excluded as indicated by block 44, such as the monitoring cell 22, the Name of Officer cell 23, the Badge number cell 24 and the Home Office of Arresting Officer cell 25 shown in FIGS. 2 and 3. The cell(s) in a sample document could be used to identifying cell(s) as indicated by block 42, such as the cells 18-29 shown in FIGS. 2 and 3. For example, use of software such as described in U.S. Patent Publication Nos. 2002/0158864, 2004/0075692 (now U.S. Pat. No. 7,269,580), and 2005/0027495 (now U.S. Pat. No. 7,454,399) could be used. The identity of the cell(s) to be excluded/included in the rule set is then recorded for that type of document as indicated by block 46 for use in the future on similar types of documents (e.g., other arrest reports). As indicated by block 48, cell(s) could also be identified to be included for use with block 40 shown in FIG. 5.

Figure 7:
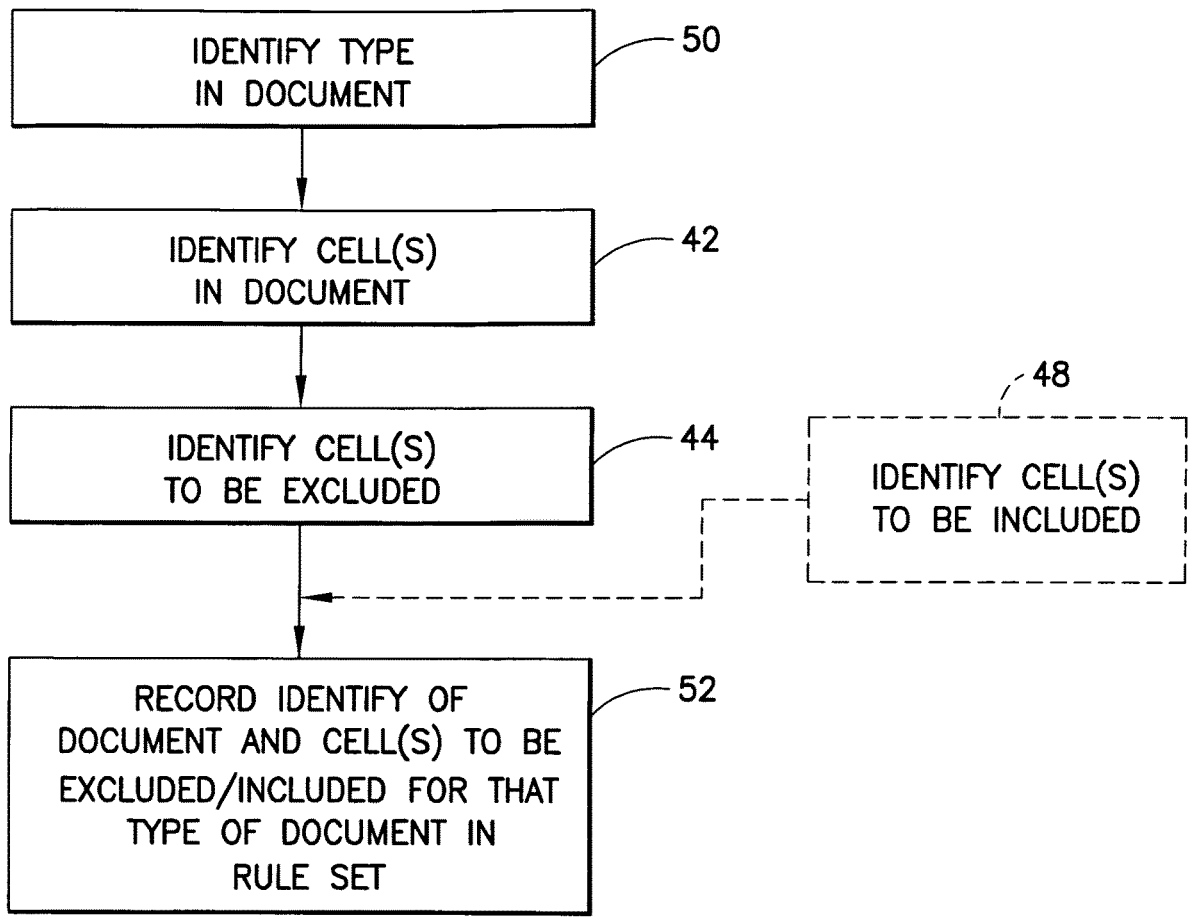
FIG. 7 is a flowchart depicting a method in accordance with the invention.

Referring also to FIG. 7, the invention can be used with different types of documents. For example, a police drug seizure report could be different than an arrest report. When the invention is used with different type documents, the redaction system is adapted to identify a type of document as indicated by block 50. This could be a manual indication of the type of document by a person inputting the document into a database, a code on the document, or automatic recognition of the document type by the redaction system for example.

After the type of document is identified, or perhaps during identification, the rule set set-up process can comprise identifying cell(s) to be excluded as indicated by block 44. The identity of the cell(s) to be excluded/included in the rule set is then recorded for that type of document as indicated by block 52 for use in the future on similar types of documents (e.g., other arrest reports). Cell(s) could also be identified to be included for use with block 40 shown in FIG. 5.

Referring also to FIG. 8, another portion of the arrest report document 12 is shown, specifically the Narrative of Arrest cell 29. Referring also to FIG. 9, which shows the cell 29 after automatic redaction by the redaction system 10, the invention can be used to redact sub-cells or text in a cell. The text could comprise words, phrases or characters or specific combinations for example. In the example shown, the names of the special agents, witness location, and name of confidential informant are automatically redacted. Other forms of information could also be redacted, such as, for example, graphical information (organization logos), visual information, photographic images, etc. These are merely examples.

Figure 10:
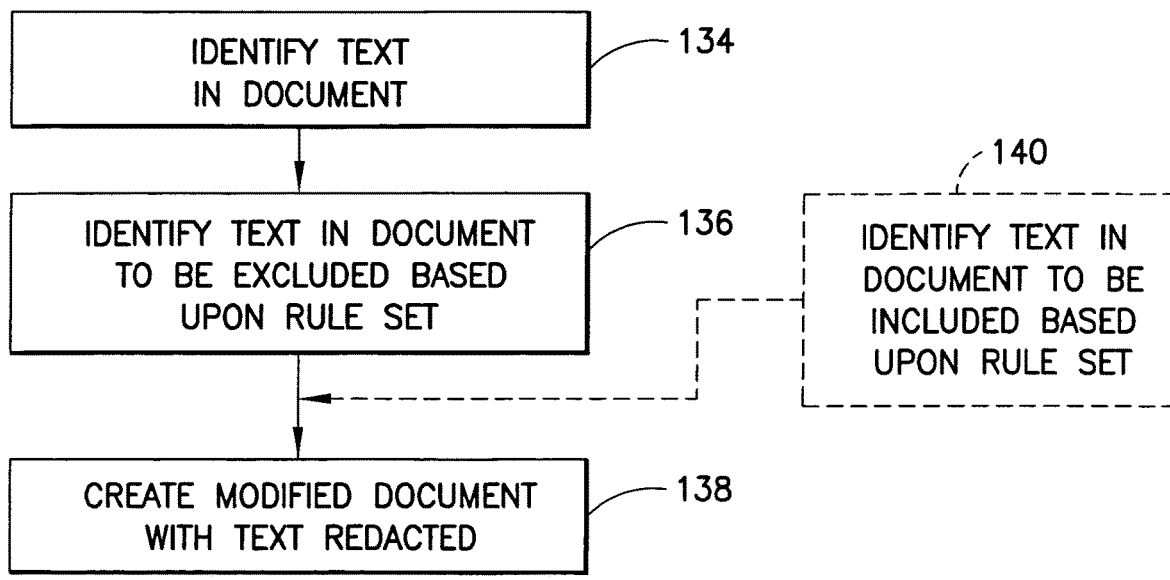
FIG. 10 is a flowchart depicting a method in accordance with the invention.

Referring also to FIG. 10, the redaction engine 30 comprises software which is adapted to identify text or words or phrases or characters in a document as indicated by block 134. The redaction engine 30 is then able to identify text or words or phrases or characters or areas in the document to be excluded based upon the rule set 32 as indicated by block 136. As indicated by block 138, the redaction engine can create a modified document with one or more of the identified areas redacted. For the example shown in FIGS. 8 and 9, the redaction engine can identify the names of the special agents, witness location, and name of confidential informant in cell 29 of the original document 12, identify the names Henry Thompson, Gary Williams, Delta Airlines, and informant Bert to be excluded based upon the rule set 32, and create the modified document 14 with the information in the automatically identified text redacted. In this embodiment the redacted information is replaced by the phrase "REDACTED". However, any suitable type of redaction marking or deletion could be provided. In addition to identifying cell(s) to be excluded, or as an alternative to identifying cell(s) to be excluded when all are to be excluded unless indicated to be included, as indicated by block 140 the redaction engine 30 could be adapted to identify cell(s) in the document to be included based upon the rule set 32. If both 136 and 140 are performed and there is a conflict, preferably block 136 will prevail. However, any suitable conflict resolution configuration or solution could be provided. In this example, the text to be redacted in cell 29 could be imported into the rule set from a database(s) containing names of police officers, confidential informants and witnesses for example.

Figure 11:
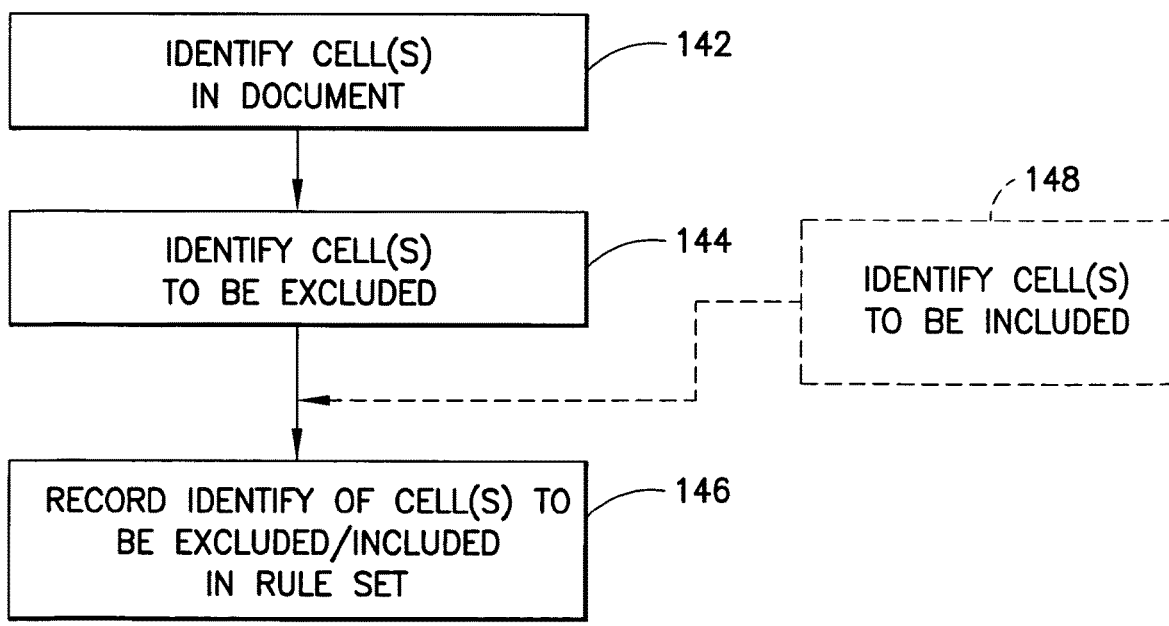
FIG. 11 is a flowchart depicting a method in accordance with the invention.

Referring also to FIG. 11, establishment of the rule set 32, or at least a portion of the rule set, can comprise identifying text to be excluded as indicated by block 144, such as the names of officers as shown in FIGS. 8 and 9. Text recognition software or an optical recognition software could be used. The text in previous redacted documents could be used to identify text to be excluded. For example, use of software such as described in U.S. Patent Publication Nos. 2002/0158864, 2004/0075692 (now U.S. Pat. No. 7,269,580), and 2005/0027495 (now U.S. Pat. No. 7,454,399) could be used. The identity of the cell(s) to be excluded/included in the rule set is then recorded for that type of document as indicated by block 146 for use in the future on similar types of documents (e.g., other arrest reports). As indicated by block 148, cell(s) could also be identified to be included for use with block 140 shown in FIG. 10.

Figure 12:
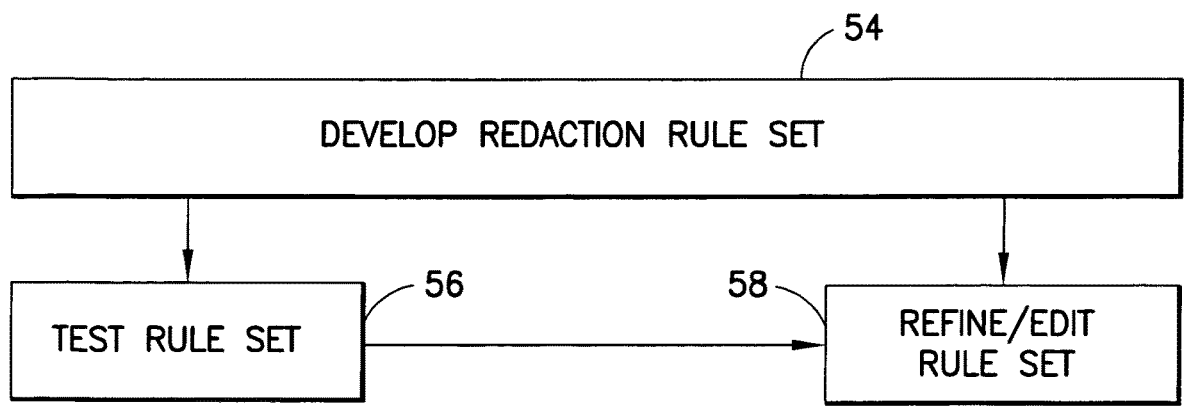
FIG. 12 is a flowchart depicting a method in accordance with the invention.

Referring also to FIG. 12, once a rule set is developed as indicated by block 54, the rule set is preferably tested as indicated by block 56. Testing can also be conducted periodically after the rule set is in place. As indicated by block 58, the rule set can preferably be refined and edited. For example, names of police officers can change because of the addition of new police officers. The rule set could be edited to include the names of new police officers. In addition, if testing finds an error or conflict causing an error, the rule set can preferably be refined. Rules could also be auto-generated based upon subsequent manual redactions by users. The rules set could be accumulating for redaction maintenance. There could be automatic use of common rules for multiple users or documents or other specifics.

Figure 13:
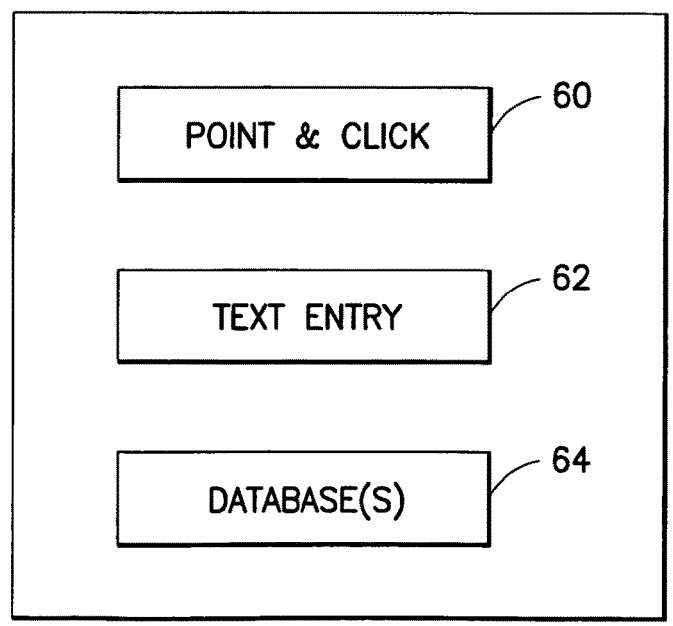
FIG. 13 depicts tools for use in entering rules into the rule set of the invention.

Referring now also to FIG. 13, identification of cells and text in a document for a rule set can comprise, for example, a point and click procedure with a mouse as indicated by block 60, a text or data entry by a keyboard as indicated by block 62, or import from another database as indicated by block 64. These are only some examples of how information can be input into a rule set. Any suitable alternative for data entry could be used including relationship correlation in text. For example:

If "X" before "Y", then redact "X" and "Y".

Figure 14:
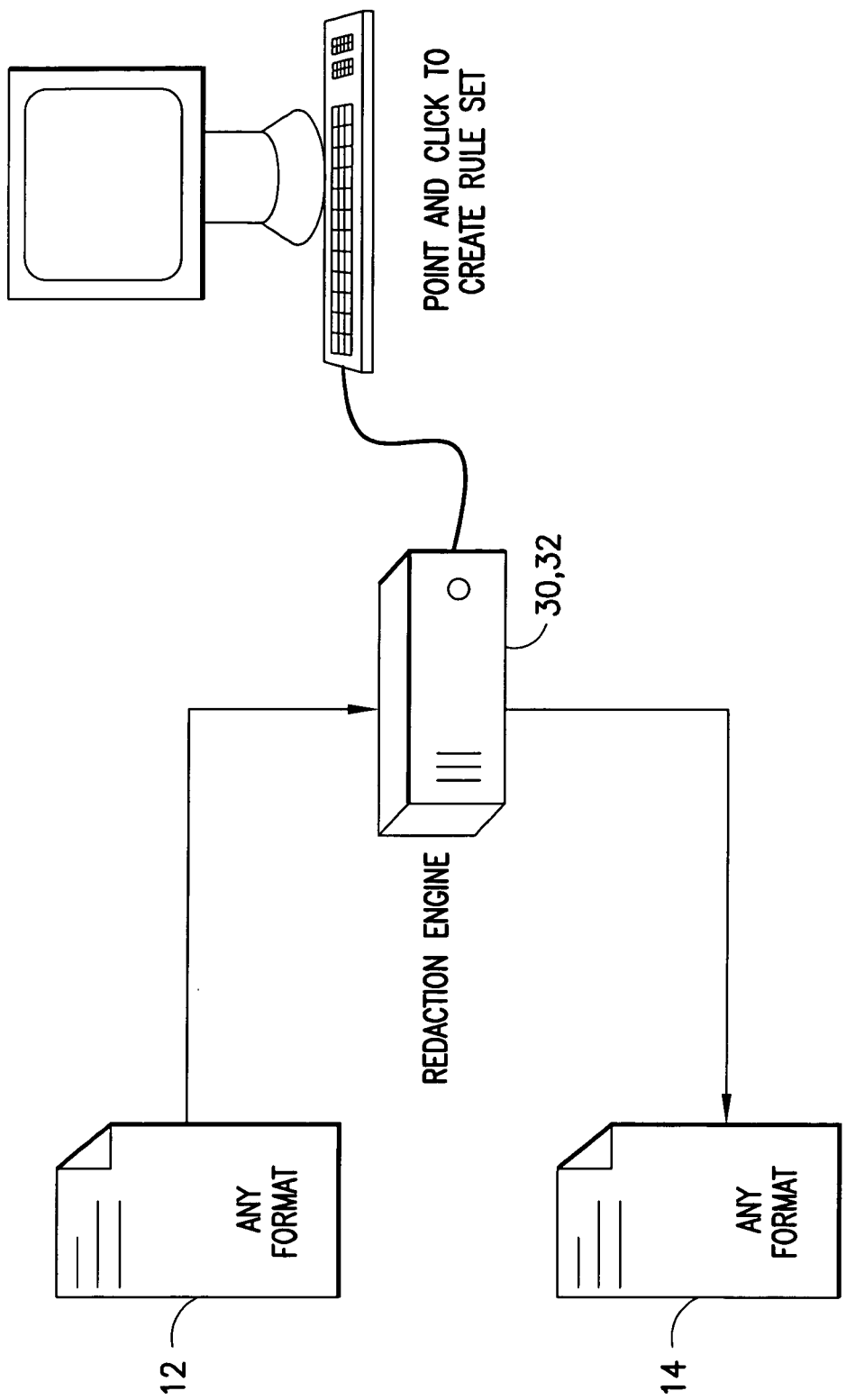
FIG. 14 depicts an aspect of the invention wherein the invention can operate on documents in any format.
Figure 15:
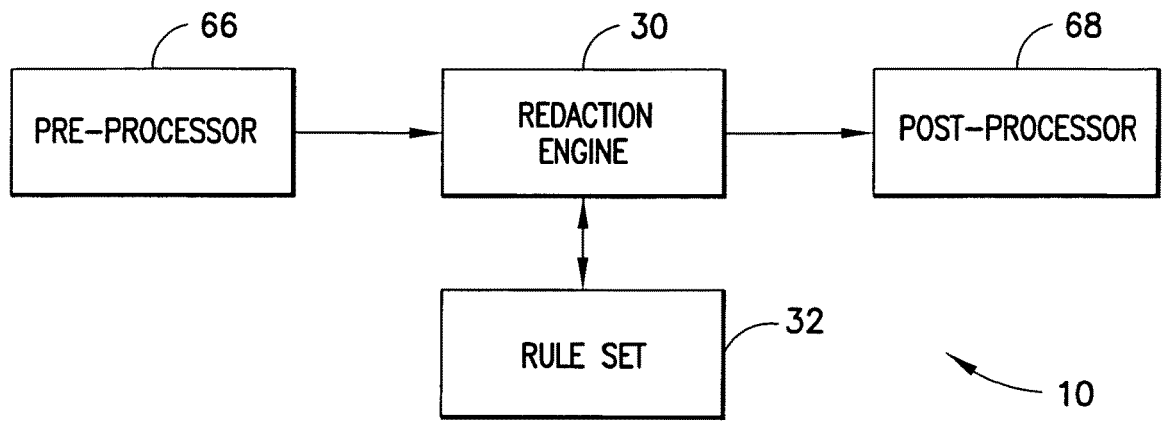
FIG. 15 is a block diagram of a system in accordance with the invention.
Figure 16:
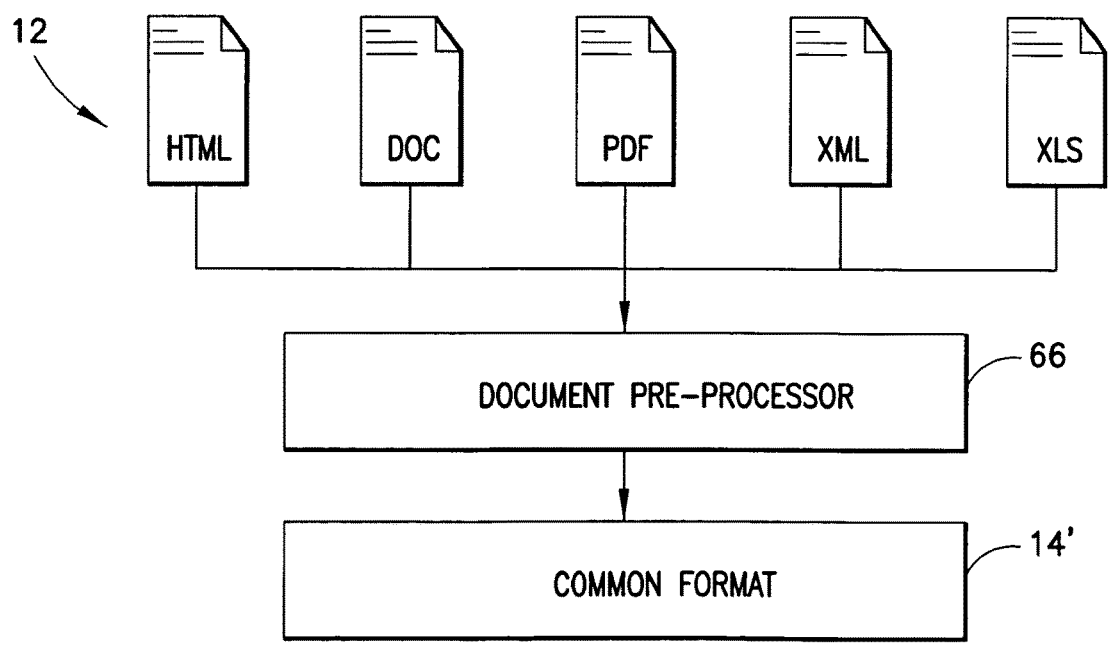
FIG. 16 is a block diagram depicting documents in several formats being input into a system operating in accordance with the invention for redaction purposes and being output in a common format.
Figure 17:
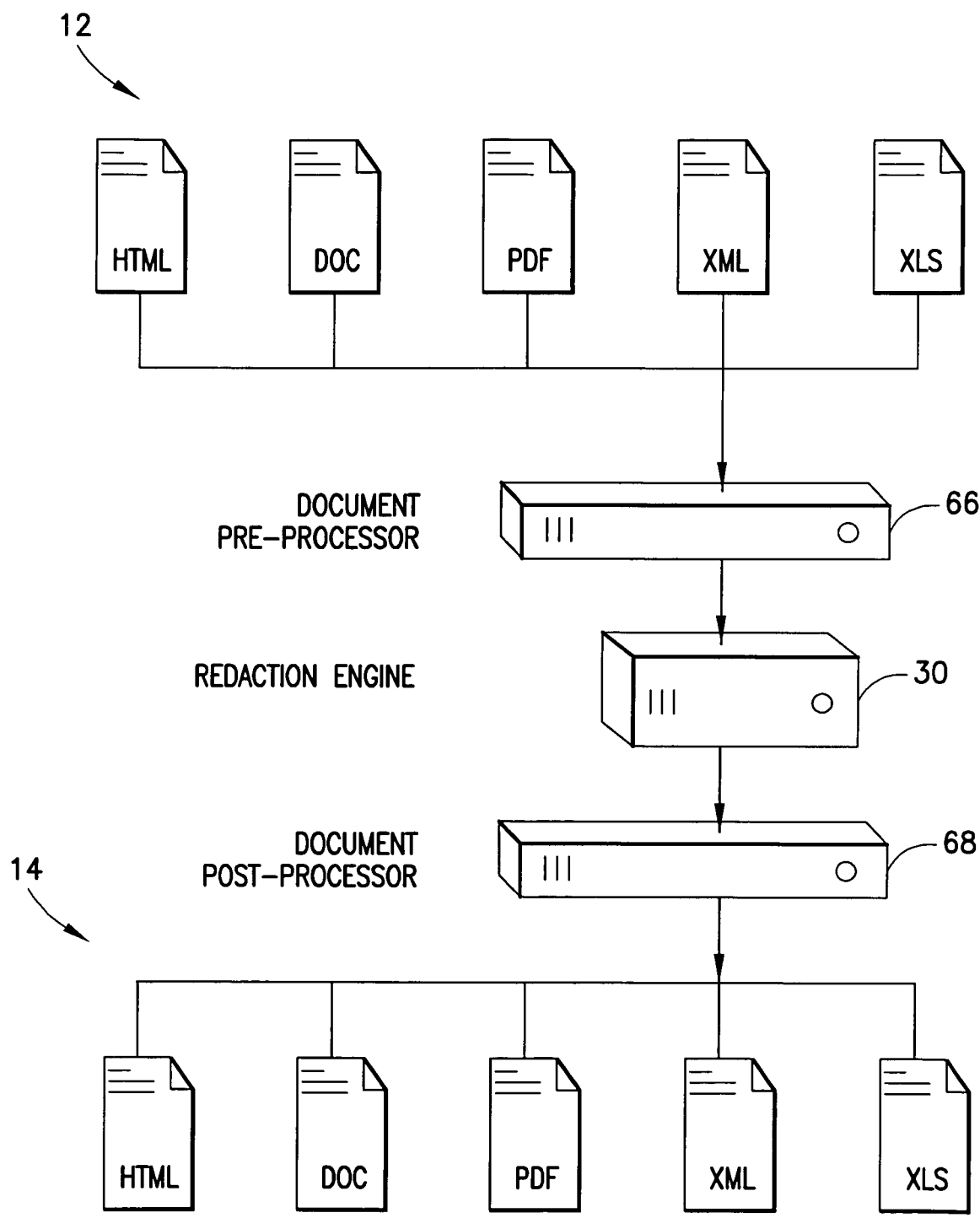
FIG. 17 is a block diagram depicting documents in several formats being input into a system operating in accordance with the invention for redaction purposes and being output in several formats.

Referring also to FIG. 14, in a preferred method the system is adapted to work with any suitable type of original document format and output any suitable type of modified document format. Referring also to FIGS. 15-17, the original document 12 could comprise any one of a plurality of different document formats. For example, the original document could comprise HTML, DOC, PDF, XML, or XLS format. The system could be adapted to work with any suitable format. Those formats mentioned above are merely examples. As illustrated in FIG. 15, the redaction system 10 can comprise a document pre-processor 66 and a document post-processor 68. As seen with reference to FIG. 16, the document pre-processor 66 is adapted to convert the format of the original document 12 to a common format 14' such as WEBRECORDER™ XML format or CELWARE XML format by CelCorp Inc. for example. This allows a document to be broken into regions to be identified with the redaction rule set. After the redaction engine, the document post-processor 68 can convert the modified document from its common format 14' to a target format 14, such as a HTML, DOC, PDF, XML, or XLS format for example.

Figure 18:
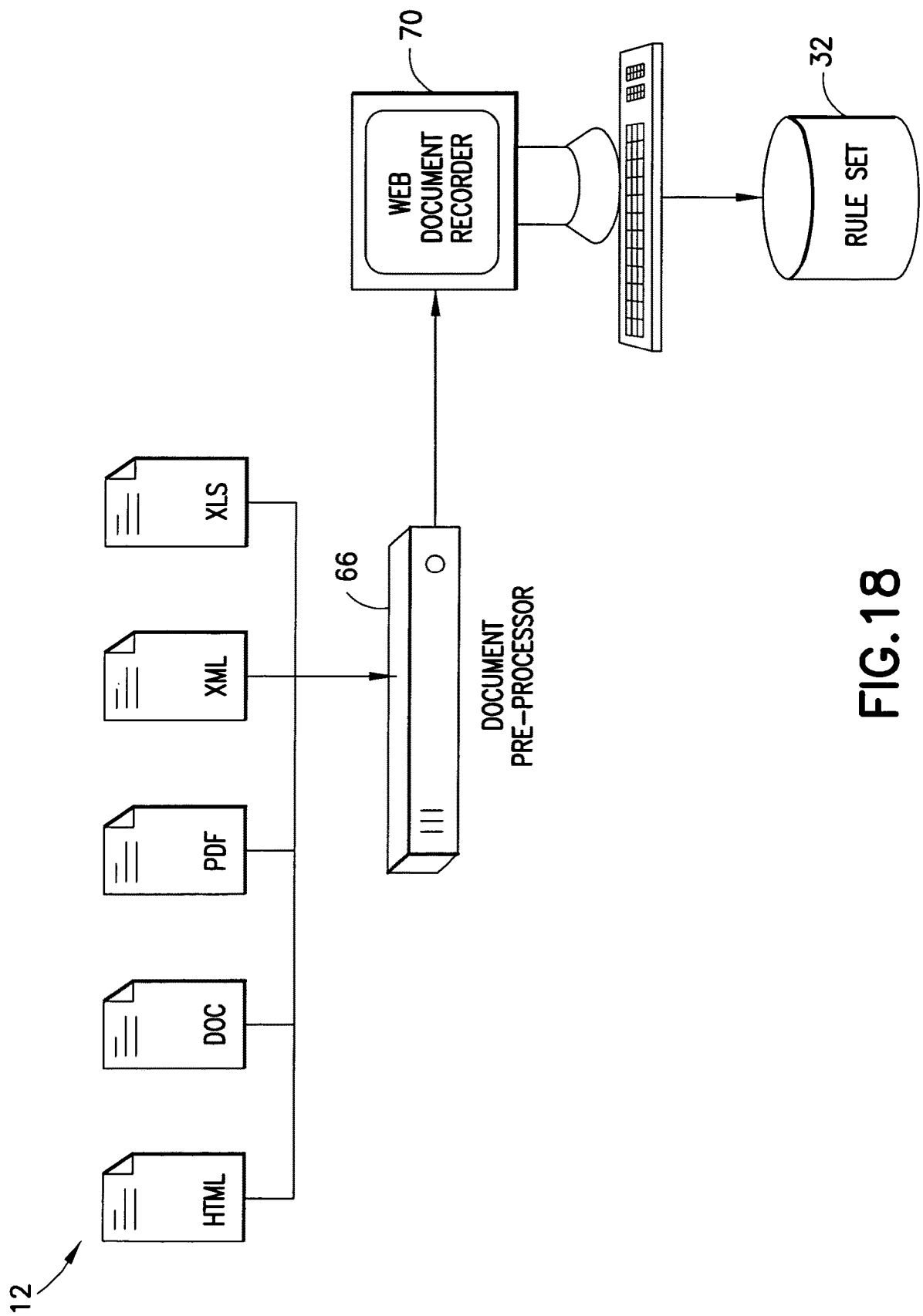
FIG. 18 is a block diagram of a system in accordance with the invention operating in a networked environment.

Referring also to FIG. 18, features of the present invention could be used over the Internet or on a web site. A web document recorder 70 could be connected to as a server for a web site. The recorder 70 could form a link to the documents via the Internet, but with the redaction engine running in the recorder 70. The recorder 70 could apply the rule set 32 as needed when the documents are viewed on the web site supported by the web document recorder 70.

Figure 19:
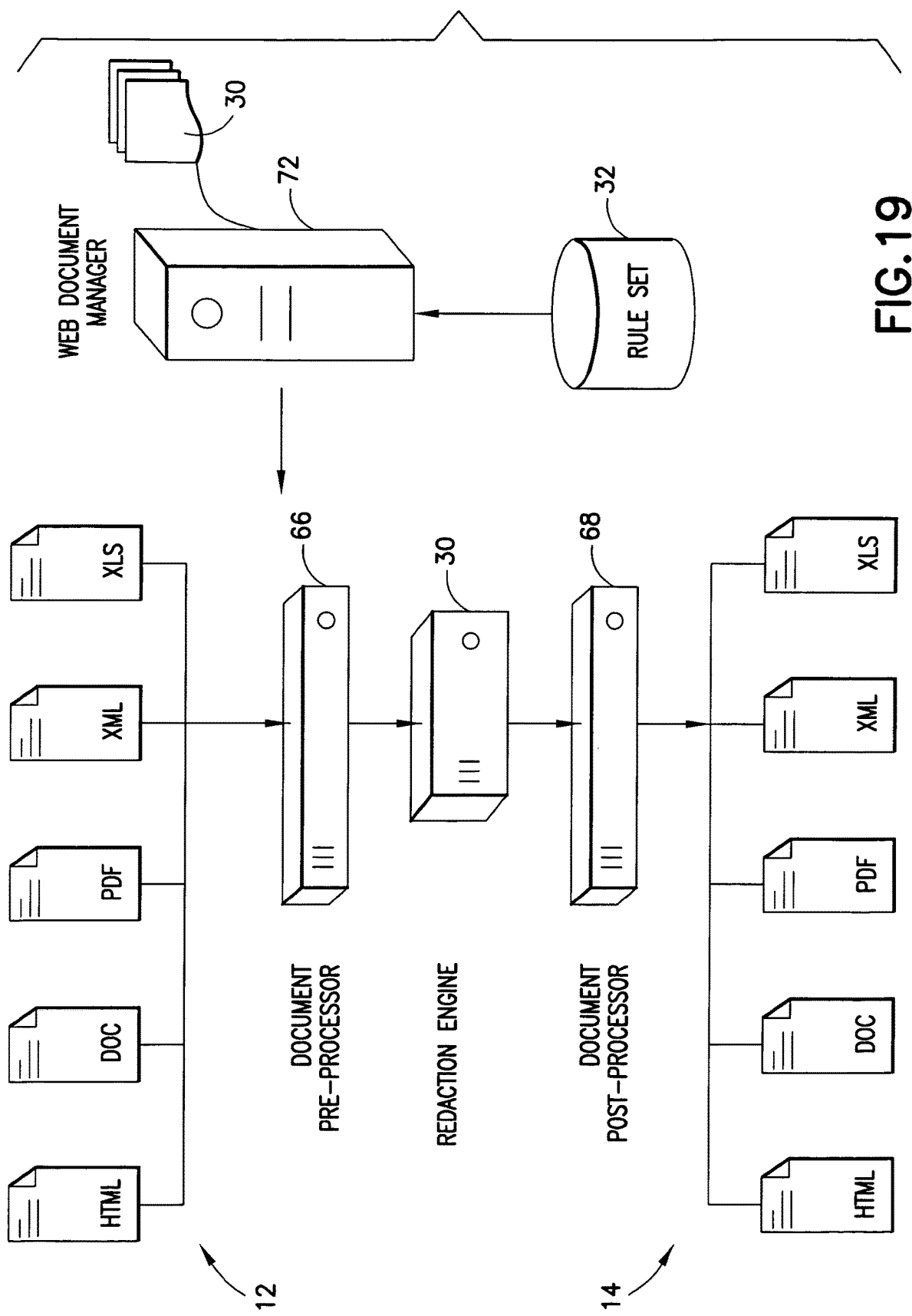
FIG. 19 is a block diagram of a system in accordance with another embodiment of the invention operating in a networked environment.

Referring also to FIG. 19, features of the present invention could be used with a web document manager or server 72. The manager 72 could manage application of the rule set with the document pre-processor 66, redaction engine 30 and document post-processor 68. With this type of system the same rule set 32 could be used with multiple redaction engines.

Figure 20:
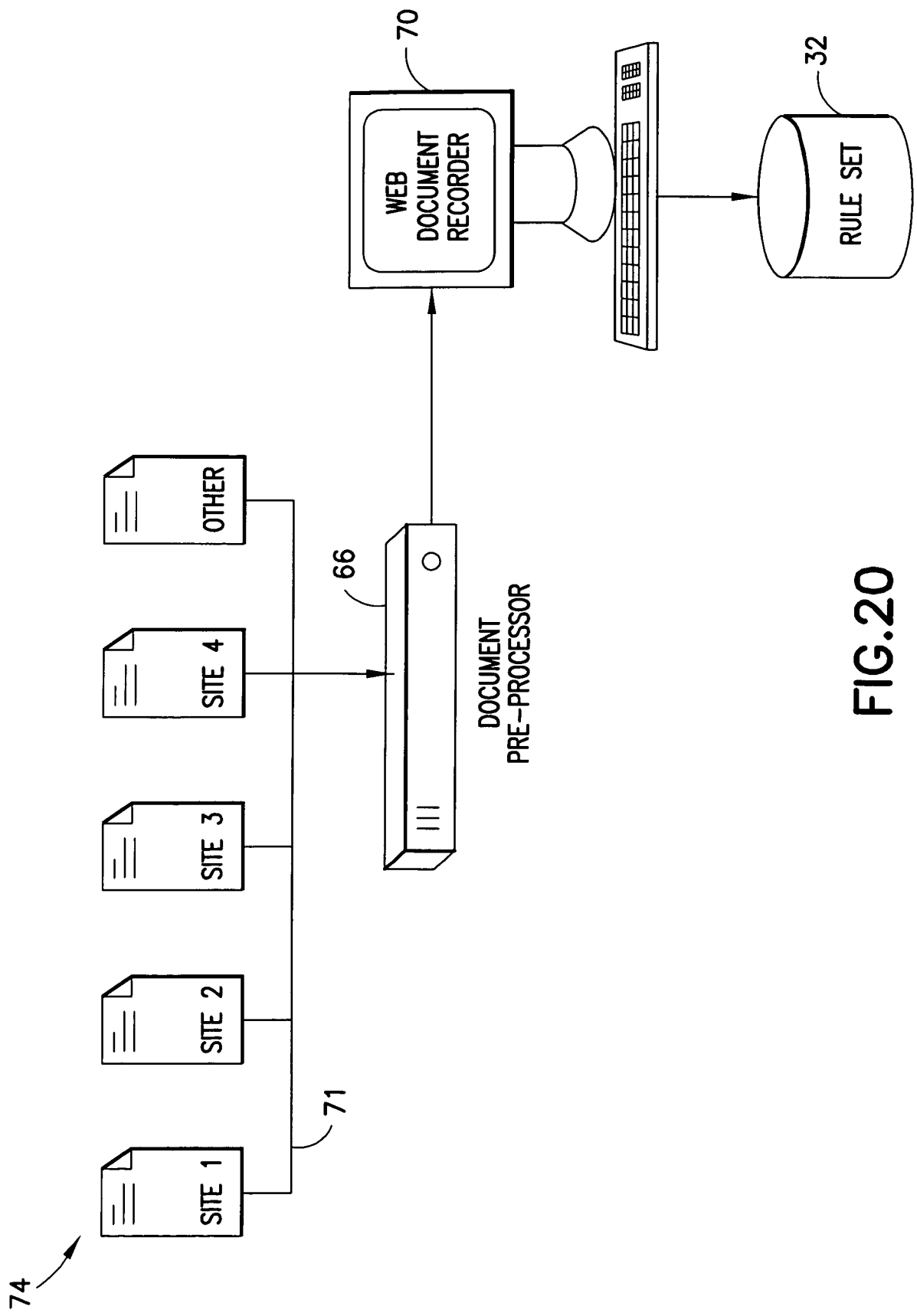
FIG. 20 is a block diagram depicting a system operating in accordance with the invention in which documents sourced from several sites over a network are input into a system for redaction purposes.

Referring also to FIG. 20, the system shown in FIG. 18 could be used in connecting documents from multiple sites 74 to the web document recorder 70 such as 71 symbolizing the Internet or a computer network.

Figure 21:
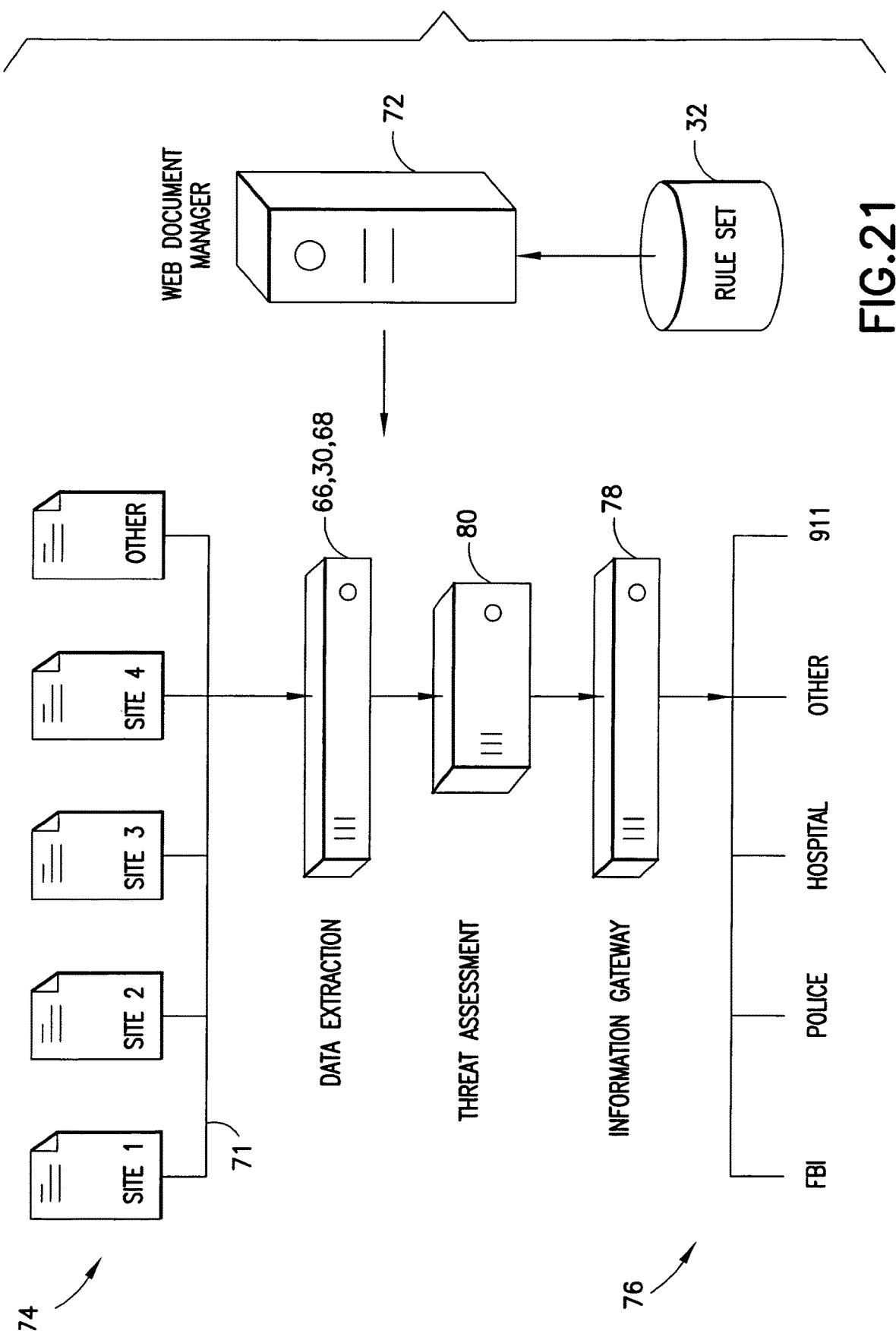
FIG. 21 is a block diagram depicting a system operating in accordance with the invention in which documents sourced from several sites over a network are input into a system for redaction purposes and then made available over a network following redaction.
Figure 22:
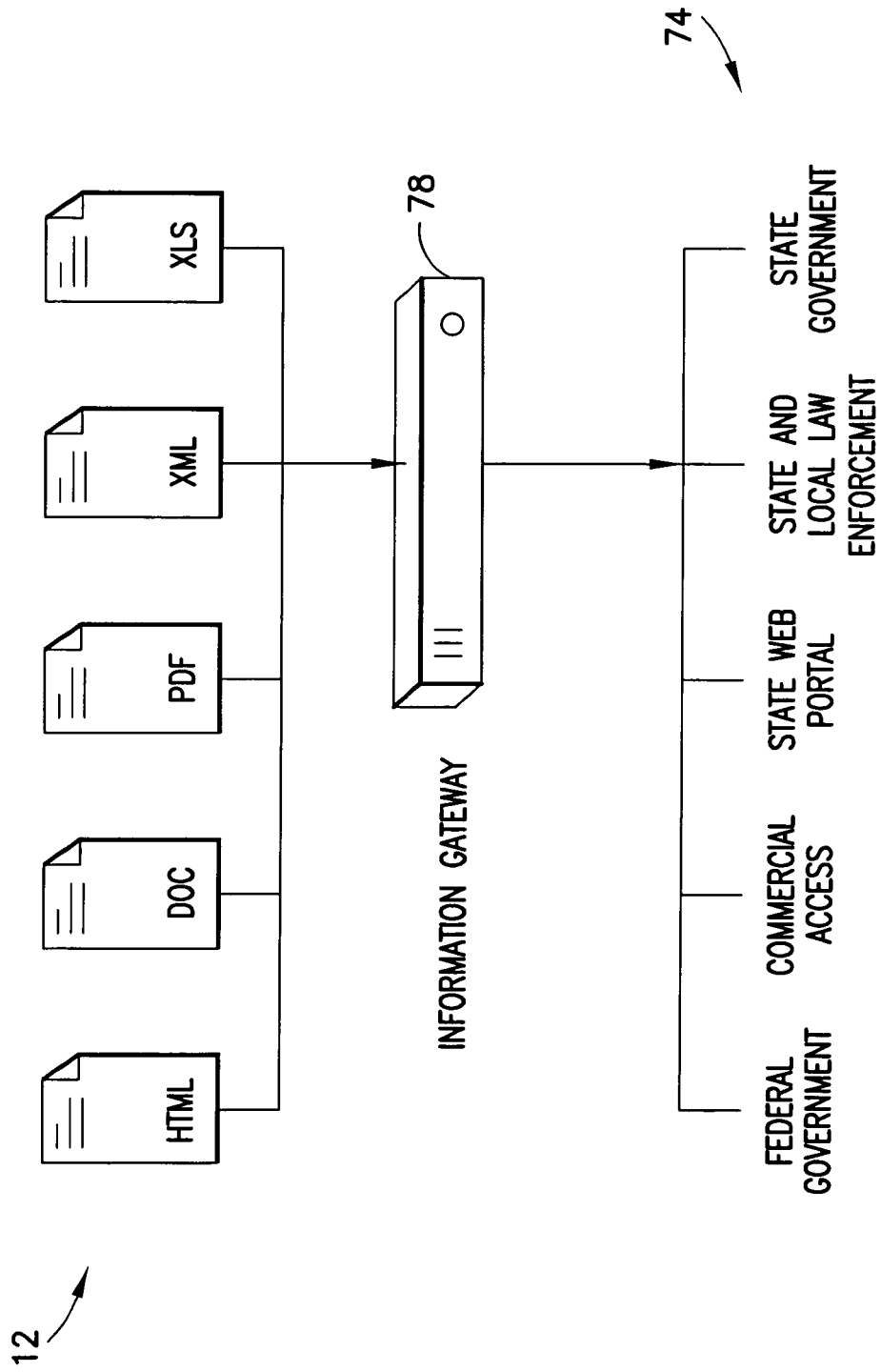
FIG. 22 is a block diagram depicting a system operating in accordance with the invention in which documents in several formats are made available over a network following redaction.

Referring also to FIG. 21, the system shown in FIG. 19 could be used in connecting documents from multiple sites 74 to multiple agencies 76 with the addition of an information gateway 78 and perhaps a threat assessment system 80. For example, the agencies could comprise the FBI, Police, Hospitals, 911 service, or other agency. The threat assessment system 80 could record web process, automate the web process, and correlate information across web sites and other information sources. Referring also to FIG. 22, the Gateway 78 can be adapted to sort and route information such that information is available to users on a predetermined basis, such as by document type or information in the cells of the documents for example.

With the invention, documents could be redacted in real time or, alternatively, the documents could be pre-redacted and stored for subsequent viewing. Alternatively, the system could be adapted to redact documents in real time, but once redacted store the redacted document for subsequent viewing without further automated redaction being needed for the same document. In other words, a library of redacted documents could be created over time. A batch of documents could also be redacted and stored if desired for an immediate library or database of redacted documents, thus allowing separation of the redacted document database from more secure original document databases.

The methods depicted and described herein can be tangibly embodied as a computer program in a computer-readable memory medium. Such computer-readable memory media comprise an aspect of the invention. Instructions of the computer program perform operations in accordance with the methods of the invention when executed by digital processing apparatus. Tangible computer-readable memory media included, but are not limited to, hard drives, CD- or DVD ROM, flash memory storage devices or RAM memory of a computer system.

With the invention, a system can be provided comprising a source of electronic documents to be redacted; a source of redaction rules; a redaction engine coupled to the source of electronic documents and the source of redaction rules, the redaction engine configured to redact the electronic documents in accordance with the redaction rules contained in the source of redaction rules, the redaction engine configured to perform operations, the operations comprising:
 accessing electronic documents to be redacted;
 accessing redaction rules from the source of redaction rules;
 redacting the electronic documents in accordance with the redaction rules, creating redactions in the electronic documents; and
 generating tangible versions of the electronic documents containing the redactions.

The source of electronic documents can comprise an electronic database. The source of electronic documents can comprise an electronic database accessible over a network. Generating a tangible version can comprise displaying redacted versions of the electronic documents on a display screen. Redacting the electronic documents in accordance with the redaction rules can comprise identifying the electronic documents by document type; selecting redaction rules to be applied to the electronic documents in dependence on the identified document type; and redacting the electronic documents in accordance with the selected redaction rules.

The electronic documents can comprise categories of information; where the redaction rules specify which categories of information are to be redacted; and where redacting the electronic documents in accordance with the redaction rules further comprises redacting information contained in the electronic documents corresponding to the categories of information specified in the redaction rules. The categories of information can comprise text information. The categories of information can comprise graphical information. The graphical information can comprise an organization logo. The categories of information can comprise visual information. The visual information can comprise photographic information. The electronic documents can comprise a plurality of document cells, where the selected redaction rules specify which document cells are to be redacted, and where redacting the electronic documents in accordance with the selected redaction rules further comprises redacting the document cells in the electronic documents specified in the selected redaction rules. The electronic documents can comprise categories of text, where the selected redaction rules specify which categories of text are to be redacted, and where redacting the electronic documents in accordance with the selected redaction rules further comprises redacting text in the electronic document corresponding to categories of text specified in the selected redaction rules. The electronic documents can contain identification codes identifying document type, and where identifying the document further comprises detecting the identification codes in the electronic documents to determine document type.

The identifying the electronic documents by document type can comprise receiving inputs identifying the electronic documents by document type. Identifying the electronic documents by document type can comprise using pattern recognition to identify the electronic documents by document type. Document redaction can be performed in real time. The electronic documents can be stored in unredacted form and wherein redacting the electronic documents in accordance with the redaction rules is performed in real time when a user not entitled to view in unredacted form an electronic document contained in the source of electronic documents accesses the electronic document. Redacting the electronic documents in accordance with the redaction rules can be performed prior to requests for electronic documents contained in the source of electronic documents, the operations further comprising: saving to memory redacted electronic documents.

The source of electronic documents can comprise a scanning system configured to convert hard copies of documents to electronic documents; and a database configured to store the electronic documents created by the conversion. The invention can be used for a "point of scan redaction" for a scan machine or "point of copy redaction" for a copy machine. Redactions can be reflected in the tangible version by redaction indicia, the redaction indicia identifying what categories of information have been redacted in the electronic documents. Redactions might not be identified by redaction indicia, the absence of redaction indicia masking what categories of information have been redacted in the electronic documents. The source of redaction rules can comprise a redaction rule entry system configured to receive redaction rules to be used when performing redaction operations. The redaction rule entry system can comprises a redaction rule editing system for editing pre-existing redaction rules comprising the source of redaction rules. The redaction rule entry system can be configured to receive commands associating redaction rules with specific electronic document types, wherein a particular redaction rule associated with a particular electronic document type is used when redacting electronic documents corresponding to the particular electronic document type.

The source of redaction rules can comprise rules specifying cells in electronic documents to be reproduced without redaction. The operations can comprise identifying cells in electronic documents corresponding to cells the redaction rules specify are to be reproduced without redaction; reproducing the identified cells without redaction. The operations can comprise detecting a conflict between at least one rule indicating a particular cell is to be redacted and at least one rule indicating the particular cell is to be reproduced without redaction; and resolving the conflict. The system can further comprise a manual redaction entry system configured to allow users to manually redact electronic documents; and where the source of redaction rules further comprises an automated system configured to monitor patterns of manual redactions entered by users and to generate redaction rules in dependence on the monitoring activity.

The source of redaction rules can comprise rules specifying categories of information to be reproduced without redaction. At least one of the categories of information can comprise text information. At least one of the categories of information can comprise graphical information. At least one of the categories of information can comprise visual information. The visual information further can comprise photographic images. The system is can be configured to redact electronic documents recorded in a plurality of different electronic formats.

The system can further comprise an electronic document pre-processor configured to identify which electronic format a particular electronic document is recorded in and to convert the particular electronic document to a common electronic format. Redacting the electronic documents in accordance with the redaction rules can comprise performing the redaction operations on the electronic documents when the electronic documents are in the common format. The electronic document pre-processor can be configured to impose a cell format on a particular electronic document in dependence on redaction rules contained in the source of redaction rules. Redacting the electronic documents in accordance with the redaction rules can comprise redacting cells generated in the particular electronic document by the imposition of a cell format. The system can further comprise an network gateway for disseminating redacted electronic documents to users.

A computer program product can be provided comprising a computer readable storage medium storing a computer program configured to perform redaction operations when executed by digital processing apparatus, the operations comprising:
accessing an electronic document to be redacted;
accessing at least one redaction rule to be applied to the electronic document;
redacting the electronic document in accordance with the redaction rule; and
storing the redacted electronic document in computer memory.

The computer program product operations can further comprise generating a tangible version of the redacted electronic document. The computer program product can generate a tangible version of the redacted electronic document and further comprises displaying the redacted electronic document on a display device. The computer program product can generating a tangible version of the redacted electronic document further comprising printing a hard copy of the redacted electronic document. The computer program product operations can further comprise: after accessing the electronic document to be redacted and prior to redacting the electronic document, converting the electronic document into a different electronic format, and wherein redacting the electronic document further comprises redacting the electronic document in the different electronic format. The computer program product operations can further comprise converting the redacted electronic document into a different electronic format.

With the invention a method can be provided comprising receiving redaction rules to be used in redacting electronic documents, where the redaction rules are specified in dependence on document type; storing the redaction rules to a computer memory, the computer memory comprising a source of redaction rules; accessing an electronic document to be redacted from a source of electronic documents; identifying the electronic document to be redacted by document type; accessing redaction rules from the source of redaction rules appropriate for use in redacting the type of document to which the electronic document corresponds; redacting the electronic document in accordance with the redaction rules specified for the document type to which the electronic document corresponds, creating redactions in the electronic document; and generating a tangible version of the electronic document containing the redactions.

One of the features of the invention is the ability to provide a document management workflow for redacted documents, such as with use of a "plug-in" for an application or a software program which runs in the background for example. This could be an event driven redaction system. For example, in one type of situation, an un-redacted document could be stored in a database. When a user opens the stored document via his/her computer with use of a software application (such as ADOBE® ACROBAT® for example) this could trigger running of a software plug-in which automatically causes redaction of certain areas on the stored document when the document is displayed at the user's computer. The invention could be integrated or operably connected to any suitable document viewing application or similar application, such as MICROSOFT WORD® or MICROSOFT INTERNET EXPLORER® for example. The event of accessing the stored document causes a redacted document to be produced. Other events could trigger the automated redaction process.

In another type of embodiment, an electronic form of a document could be stored in a memory with certain codes to indicate one or more areas of the form which should be redacted when the stored document is viewed in an application. The codes are preferably configured such that the stored document is not viewable unless the stored document is opened with a software application having the appropriate redaction software. When the stored document is opened with a software application having the appropriate redaction software (such as plug-in or background application), then only a redacted version of the document would be viewable. Thus, a "point-of-viewing" or "point-of-opening" redaction system could be provided.

Figure 23:
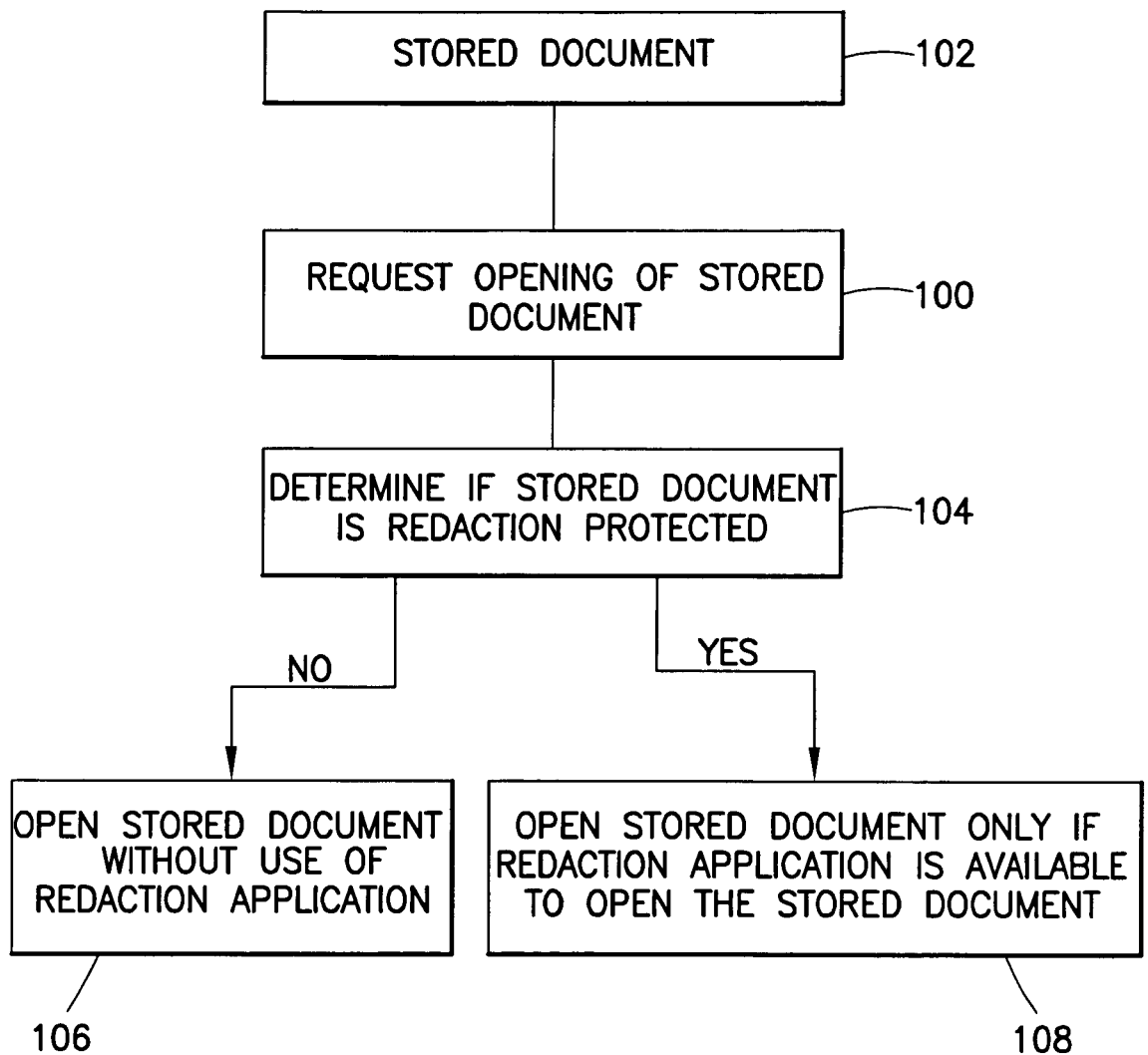
FIG. 23 is a diagram illustrating some steps which could be used with one method of the invention.

This type of situation is illustrated in FIG. 23. When a user requests 100 opening of a stored document 102, the system is able to determine 104 if the requested document is redaction protected. For example, the determination of redaction protection could be based upon a location where the document is stored in a memory, or a code in the document, or any other suitable identification. If it is determined that the stored document is not redaction protected (and does not need redaction protection) the document could be opened as indicated by block 106 without use of the redaction application (such as the plug-in or background running application). If it is determined that the stored document is redaction protected, the document would be prevented from being opened unless opened with the redaction application as indicated by block 108.

As another embodiment, a "point-of-accessing" redaction could be provided. In this type of event, as soon as a stored electronic document is accessed, such as for copying for example, the event of accessing the stored document could cause an automatic redacted form of the document to be created. The redacted document could be the document which is copied rather than the stored document.

As another event driven redaction, this could comprise scanning of a document by a scanner. Thus, the invention can be used at the "point-of-scan" of an electronic form of a document. The event of scanning could automatically trigger software to redact portions of the scanned image and storage of the redacted image in a memory. Thus, the plug-in or background application could be loaded into the scanner or a server/computer which the scanner is connected to. The redaction process might be totally unseen or unrecognized by the person doing the scanning. Alternatively, the use of the plug-in or background software application for redaction could need at least some user initiation in order to activate.

Figure 24:
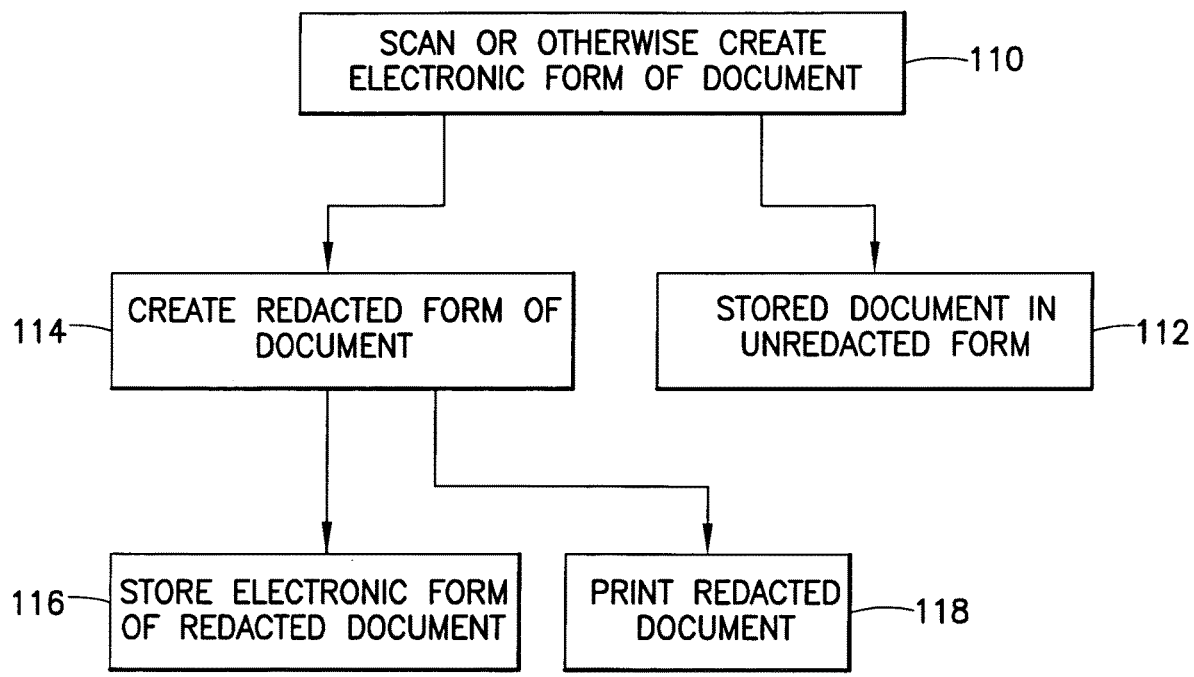
FIG. 24 is a diagram illustrating some steps which could be used with one method of the invention.
Figure 25:
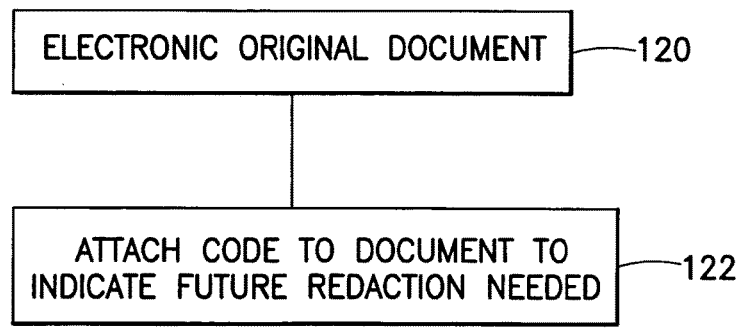
FIG. 25 is a diagram illustrating some steps which could be used with one method of the invention.

As seen in FIG. 24, the method can comprise scanning or otherwise creating an electronic form of a document as indicated by block 110. The electronic document can be stored in unredacted form as indicated by block 112 and/or a redacted form of the document can be created as indicated by block 114. If a redacted form of the document is created, it can be stored electronically as indicated by block 116 and/or the redacted document can be printed as indicated by block 118. Referring also to FIG. 25, when storing 112 the unredacted form of the document 120 a code can be attached as indicated by block 122 to indicate that future redaction is needed.

These are only some examples of how redaction can be integrated into document workflow creation, storage, access and control. The invention could be used with any type of workflow arrangement. For example, as seen in FIG. 22, the invention could be used with workflow applications having HTML, DOC, PDF, MXL and XLS documents. Besides being used with a client computer connected to a server computer in an intranet type of situation, the invention could be used for accessing, copying, opening and/or viewing of documents via the Internet or World Wide Web. With an after-storage event driven redaction system, by merely attaching an appropriate code(s) or locating documents in a pre-determined storage location which would attach a redaction protection code to a document stored in the location, a large volume of documents need not be redacted. Instead, only an immediately accessed document will need to be redacted at any time. This can save an enormous quantity of processor time. Thus, for example, for a database having 10 million documents with data needing to be redacted for one reason or another, processor time will not use up the time needed to redact 10 million documents. Instead, the only processor time needed for redaction will be the time necessary to redact a real-time requested document.

Figure 26:
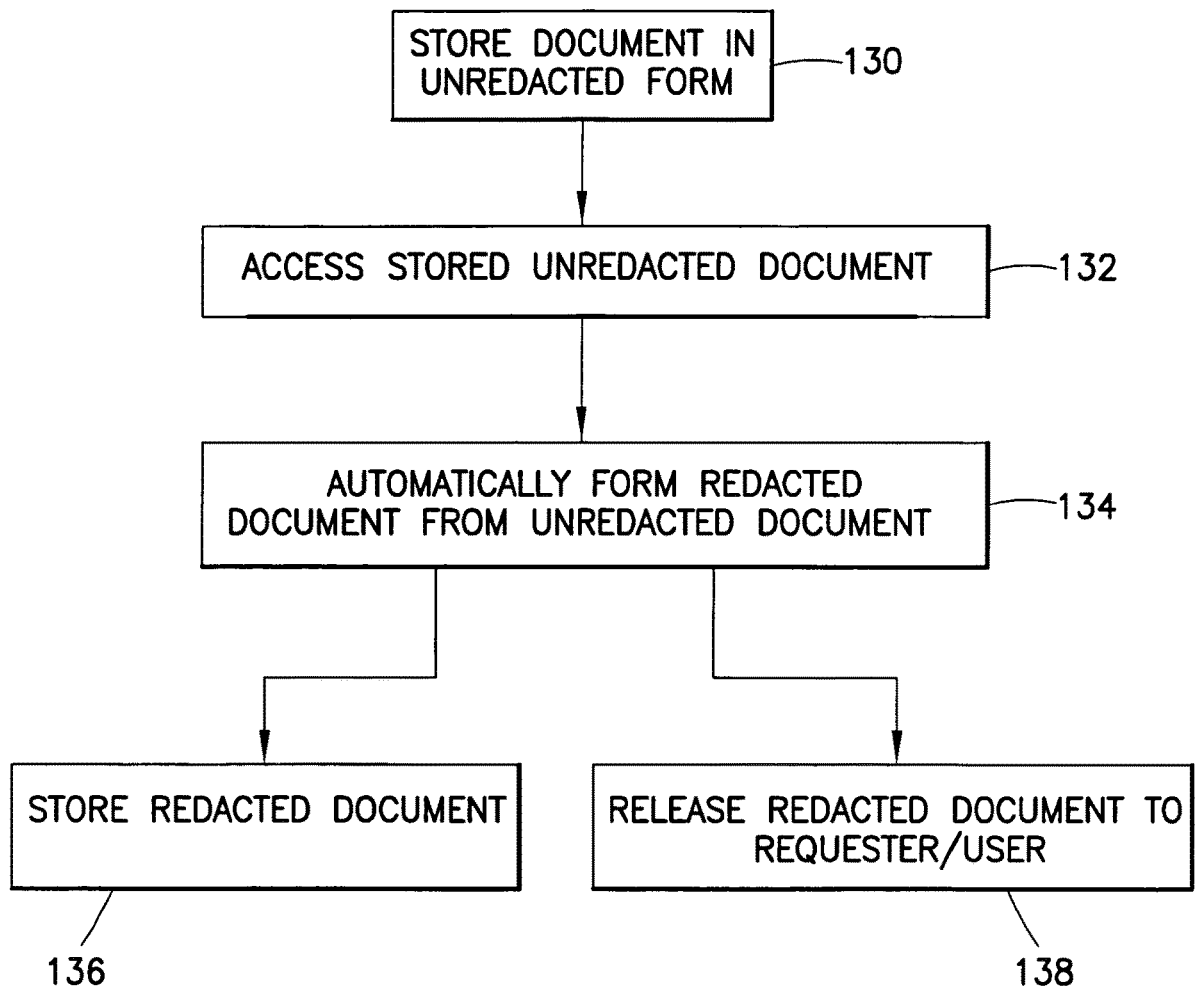
FIG. 26 is a diagram illustrating some steps which could be used with one method of the invention.

In one type of embodiment, after a document is singularly (or small group) real-time redacted based upon a user request for access, opening, copying or viewing, the redacted version of the document can be separately stored for future access if needed. Therefore, the same document does not need to be reacted more than once. This is illustrated by the example in FIGS. 26-27. As illustrated by FIG. 26, a document can be stored 130 in unredacted form in a memory. A request 132 to access the stored unredacted document can be made by a user and the application software can automatically form a redacted version of the document as indicated by block 134. The redacted document can be stored as indicated by block 136 in a separate location or could replace the unredacted document. The unredacted document is also released to the requester/user as indicated by block 138.

Figure 27:
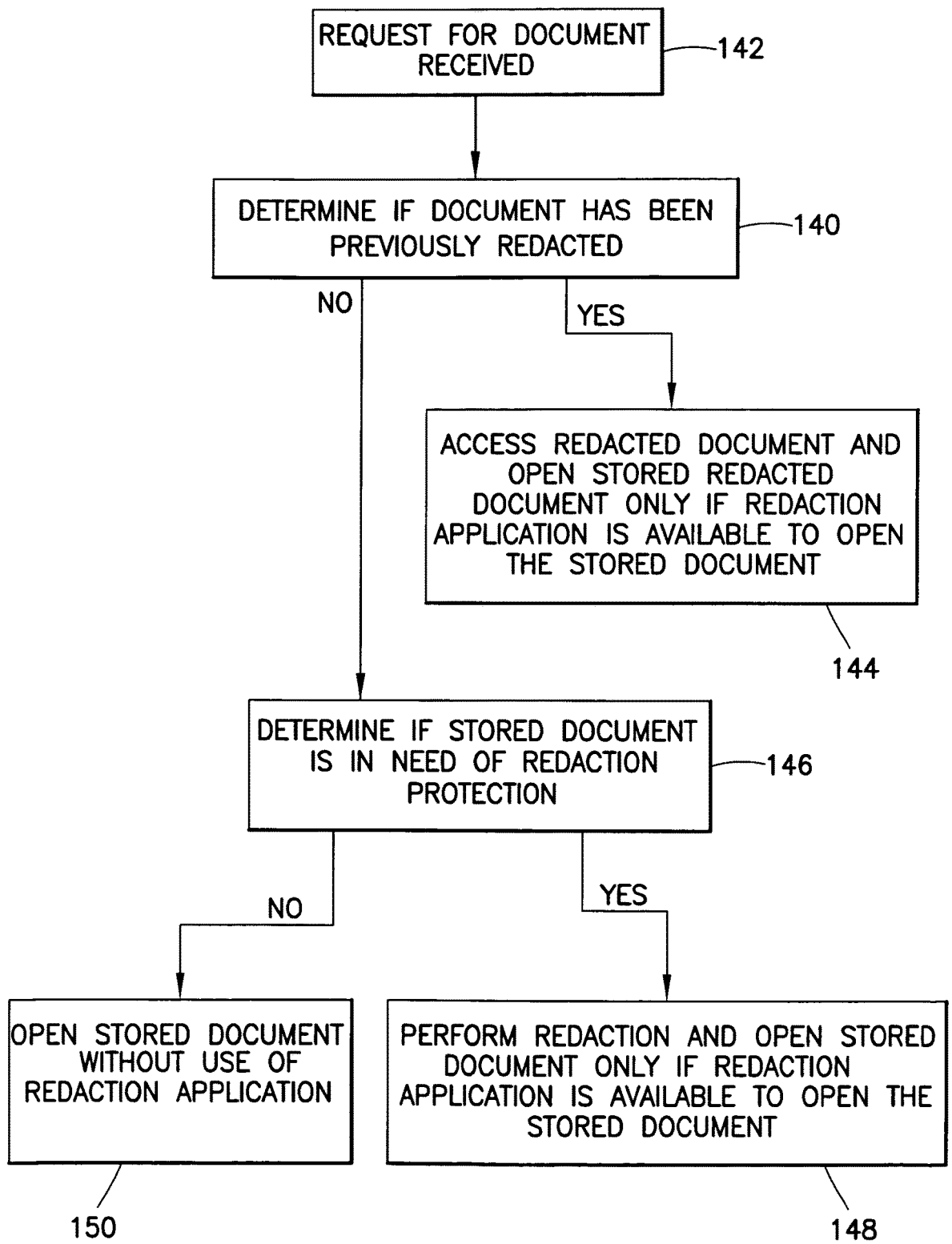
FIG. 27 is a diagram illustrating some steps which could be used with one method of the invention.

As seen in FIG. 27, a method can comprise determining 140 if a stored document has been previously redacted based upon a request 142 for the document. If the document has been previously redacted, as indicated by block 144 the redacted document is accessed and opened only if the redaction application is available to open the stored document. If the document has not been previously redacted, then it is determined if the stored document is in need of redaction protection as indicated by block 146. If yes, then redaction is performed and the redacted document can be opened only if the redaction application is available to open the stored document as indicated by block 148. In no, then the document can be opened without the use of the redaction application as indicated by block 150.

Figure 28:
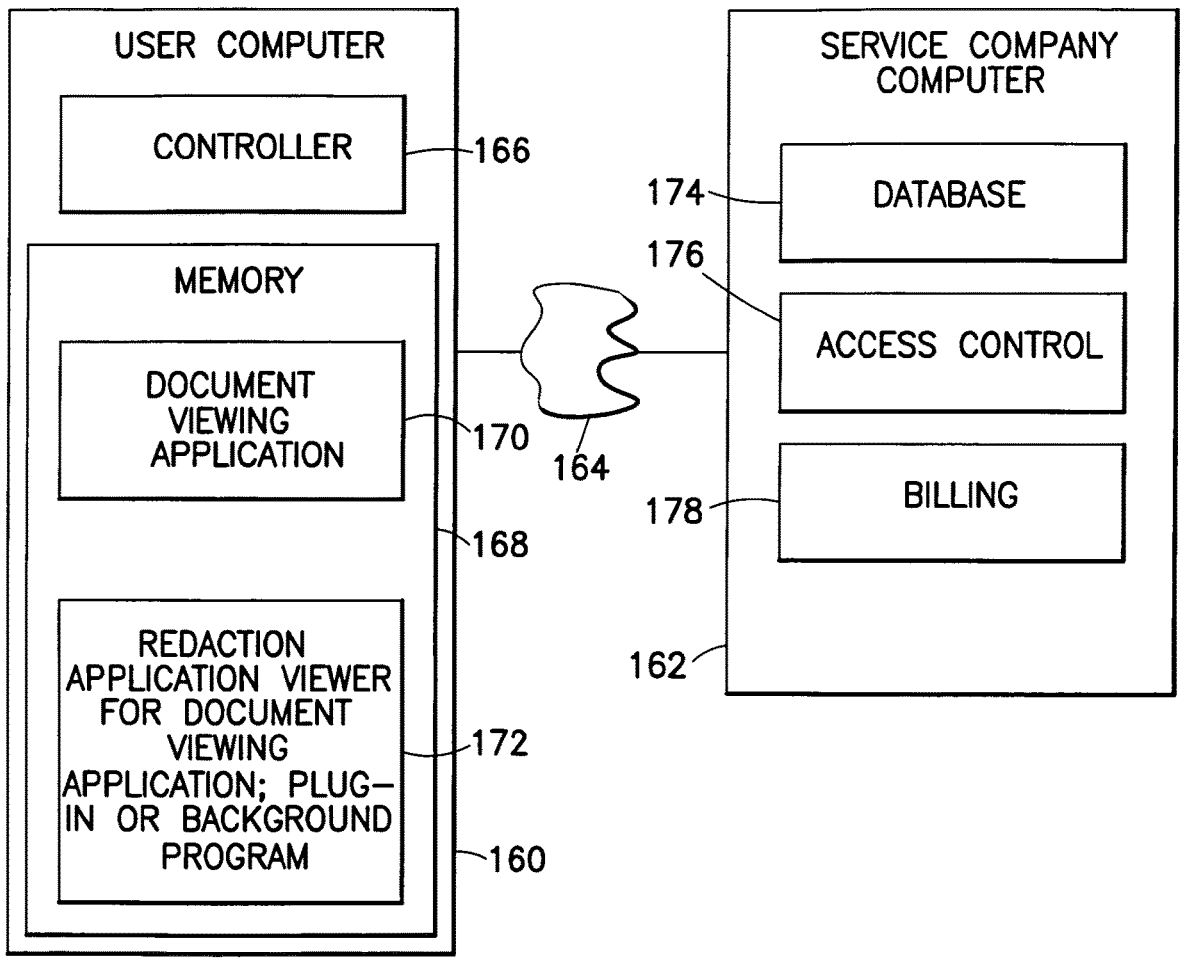
FIG. 28 is a diagram illustrating a system comprising features of the invention.

Referring also to FIG. 28, a diagram is shown illustrating connection of a user's computer 160 to a second computer 162 via a connection 164. In the embodiment shown the second computer 162 is a computer system hosted by a service company. However, in an alternate the second computer could be hosted by the same company which owns the user computer 160 or an otherwise totally unrelated company. The user computer 160 comprises a controller 166, a memory 168, a display (not shown) and perhaps a printer (not shown). The memory 168 includes document viewing application software 170 such as MICROSOFT® WORD® or ADOBE® ACROBAT® or MICROSOFT® INTERNET EXPLORER® for example. The memory 168 also comprises redaction application viewer software 172 for the document viewing application, such as a plug-in or background application as described above. The redaction application viewer software 172 cooperates with the document viewing application software 170 to allow viewing of redacted documents with the document viewing application software 170.

The service company computer 162 generally comprises a database 174, an access control section 176 and billing section 178. The billing section 178 can be used to allow the service company to charge a fee for its services. The access control section 176 can be used to restrict access to documents to authorized entities or people, and/or restrict access based upon fees paid for services. The database 174 can comprise electronic files corresponding to redacted documents, unredacted documents, and unredacted documents which have redaction codes associated with them (which can be read by the redaction application viewer 172). The connection 164 can be any suitable connection, such as the Internet for example.

With this type of system, the user computer 160 can access an electronic file corresponding to a document in the database 174, determining if the electronic document file is a redacted form of a document or an unredacted form of the document; and performing a redaction of information in the electronic document file if the electronic document file is determined to be an unredacted form of the document. Alternative, or additionally, the user computer 160 can access an electronic file corresponding to a document in the database 174, determining if an electronic document file is a redacted form of a document or an unredacted form of the document; and when the electronic document is determined to be the redacted form of the document, preventing opening of the document by a document viewing application unless a redaction application 172 is operably connected to the document viewing application.

One of the features of the invention is the ability of the invention to be used with a "point of creation" and/or "point of scan/copy" redaction document management workflow.

Thus it is seen that the foregoing description has provided by way of exemplary and non-limiting examples a full and informative description of the best methods and apparatus presently contemplated by the inventors for performing document redaction. One skilled in the art will appreciate that the various embodiments described herein can be practiced individually; in combination with one or more embodiments described herein; or in combination with redaction systems differing from those described herein. Further, one skilled in the art will appreciate that the invention can be practiced by other than the described embodiments; that the described embodiments are presented for the purposes of illustration and not of limitation; and that the invention embraces all alternatives, modifications and variations that fall within the scope of the following claims.

What is claimed is:

1. A non-transitory computer program product comprising a computer readable storage medium storing a computer program configured to perform operations when executed by digital processing apparatus, the operations comprising:
   after receiving a request for an electronic document file of a document by the apparatus from a user, determining by the apparatus whether the electronic document file, which is stored in at least one non-transitory memory, is a redacted form of the document or an unredacted form of the document; and
   selecting one of:
      transmitting the electronic document file by the apparatus to the user after the electronic document file has been determined to be the redacted form of the document; or
      automatically performing a redaction of information in the electronic document file caused by the apparatus having determined that the electronic document file is the unredacted form of the document and transmitting the automatically redacted electronic document file by the apparatus to the user, where the redaction is performed with use of a redaction rule set stored in the apparatus, where the stored redaction rule set comprises information regarding identities of authorized users which is used to authorize performance of the redaction and subsequent transmission of a redacted form of the electronic document file to the user.

2. The non-transitory computer program product of claim 1 wherein the operations further comprise:
   after performing the redaction, automatically storing the subsequently formed redacted form of the electronic document in the at least one non-transitory memory.

3. A non-transitory computer program product comprising a computer readable storage medium storing a computer program configured to perform operations when executed by digital processing apparatus, the operations comprising:
   determining by the apparatus whether an electronic document file comprises either a redacted form of a document or an unredacted form of the document;
   determining by the apparatus whether a redaction application is operably connected to a document viewing application; and
   based upon a determination that the electronic document file comprises the unredacted form of the document, causing the apparatus to prevent opening of the electronic document file by the document viewing application unless the redaction application has been determined by the apparatus to be operably connected to the document viewing application.

4. A non-transitory computer program product as in claim 3 where the operations further comprise:
   based upon receiving a request by an apparatus for the electronic document file or the document from a user, accessing the electronic document file by the apparatus from a source of electronic document files; and
   cause automatic performing of a redaction operation by the apparatus when the electronic document file in the source of electronic document files is determined to comprise the unredacted form of the document and with use of a redaction rule set stored in the apparatus comparing identification information regarding the user requesting the electronic document file or the document to user information in the redaction rule set.

5. A non-transitory computer program product as in claim 3 where the operations further comprise:
   based upon scanning a paper form of the document, automatically performing a redaction of information on the document, where the automatic redaction is initiated based upon the scanning;
   storing the redacted form of the document in at least one non-transitory memory, where the storing of the redacted form of the document is initiated because of the scanning; and
   storing the unredacted form of the document in the at least one non-transitory memory at substantially a same time the redacted form of the document is stored in the at least one non-transitory memory, where the storing of the unredacted form of the document is initiated because of the scanning.

6. A method comprising:
   receiving a request for an electronic document by an apparatus from a user;
   accessing the electronic document by the apparatus from a source of electronic documents based upon the request;
   determining by the apparatus whether the electronic document in the source of electronic documents is either a redacted form of an original document or an unredacted form of the original document; and
   selecting one of:
      transmitting the electronic document by the apparatus to the user after the electronic document in the source of electronic documents has been determined to be the redacted form of the original document, or
      automatically performing a redaction operation by the apparatus caused by the apparatus having determined that the electronic document in the source of electronic documents is the unredacted form of the original document and transmitting the automatically redacted electronic document by the apparatus to the user, where the redaction operation is performed with use of a redaction rule set stored in the apparatus comparing identification information regarding the user requesting the electronic document to user information in the redaction rule set;
   determining if the electronic document is redaction protected; and
   after the electronic document has been determined to be redaction protected, allowing the electronic document to be opened only if a redaction application is available to allow opening of the electronic document with a redaction.

7. A method comprising:
receiving a request for an electronic document by an apparatus from a user;
accessing the electronic document by the apparatus from a source of electronic documents based upon the request;
determining by the apparatus whether the electronic document in the source of electronic documents is either a redacted form of an original document or an unredacted form of the original document; and
selecting one of:
transmitting the electronic document by the apparatus to the user after the electronic document in the source of electronic documents has been determined to be the redacted form of the original document, or
automatically performing a redaction operation by the apparatus caused by the apparatus having determined that the electronic document in the source of electronic documents is the unredacted form of the original document and transmitting the automatically redacted electronic document by the apparatus to the user, where the redaction operation is performed with use of a redaction rule set stored in the apparatus comparing identification information regarding the user requesting the electronic document to user information in the redaction rule set;
determining if the electronic document is protected; and
after the electronic document has been determined to be protected, allowing the electronic document to be opened only if a viewer application is available to allow opening of the electronic document with a different view than an original view of the electronic document, where the different view comprises at least some information from the electronic document.

8. A method comprising:
receiving a request for an electronic document by an apparatus from a user;
accessing the electronic document by the apparatus from a source of electronic documents based upon the request;
determining by the apparatus whether the electronic document in the source of electronic documents is either a redacted form of an original document or an unredacted form of the original document; and
selecting one of:
transmitting the electronic document by the apparatus to the user after the electronic document in the source of electronic documents has been determined to be the redacted form of the original document, or
automatically performing a redaction operation by the apparatus caused by the apparatus having determined that the electronic document in the source of electronic documents is the unredacted form of the original document and transmitting the automatically redacted electronic document by the apparatus to the user, where the redaction operation is performed with use of a redaction rule set stored in the apparatus comparing identification information regarding the user requesting the electronic document to user information in the redaction rule set;
determining by the apparatus whether a redaction application is operably connected to a document viewing application; and
the apparatus preventing opening of the electronic document by the document viewing application, after the electronic document has been determined to comprise the unredacted form of the original document, unless the redaction application has been determined by the apparatus to be operably connected to the document viewing application.

* * * * *